US006061696A

United States Patent [19]

Lee et al.

[11] Patent Number: 6,061,696

[45] Date of Patent: May 9, 2000

[54] GENERATING MULTIMEDIA DOCUMENTS

[75] Inventors: Richard Daniel Lee, San Francisco; Robert K. Myers, Santa Cruz; Adam B. Feder, Mountain View, all of Calif.

[73] Assignee: Computer Associates Think, Inc., Islandia, N.Y.

[21] Appl. No.: 08/845,858

[22] Filed: Apr. 28, 1997

[51] Int. Cl.[7] ..................... G06F 17/00

[52] U.S. Cl. ..................... 707/513; 707/516; 707/523

[58] Field of Search ..................... 707/501, 513, 707/515, 516, 523; 345/335, 336; 709/302, 303

[56] References Cited

U.S. PATENT DOCUMENTS

| | | | |
|---|---|---|---|
| 5,226,163 | 7/1993 | Karsh et al. | 707/200 |
| 5,287,504 | 2/1994 | Carpenter et al. | 707/201 |
| 5,495,595 | 2/1996 | Peters et al. | 709/300 |
| 5,715,441 | 2/1998 | Atkinson et al. | 707/1 |
| 5,801,701 | 9/1998 | Koppolv et al. | 345/352 |
| 5,818,447 | 10/1998 | Wolf et al. | 345/335 |
| 5,878,258 | 3/1999 | Pizi et al. | 709/302 |
| 5,896,533 | 4/1999 | Ramos et al. | 709/300 |
| 5,910,804 | 6/1999 | Fortenbery et al. | 345/419 |
| 5,911,145 | 6/1999 | Arora et al. | 707/514 |

OTHER PUBLICATIONS

OLE—PC Webopaedia Definitiona and Links, http://www.pcwebopedia.com/OLE.htm, 1 page.

"Using OLE to Share Data Between Applications", Microsoft Corporation, 1998, wysiwyg://3/http://premium.microso . . . /winresource/dnwin95/dlc/s717a.htm, 2 pages.

"OLE Visual Editing of OLE Embedded Objects", MIcrosoft Corporation, 1998, wysiwyg://3/http:/premium.microso . . . ry/winguide/latfrm2/d5/s11688.htm, 4 pages.

"Editing an OLE Lined Object", Microsoft Corporation, 1998, wysiwyg://5/http://premium.microso . . . ry/winguide/platfrm2/d5/s1168e.htm, 2 pages.

"The Interaction Model", Microsoft Corporation, 1998, wysiwyg://7/http://premium.microso . . . ry/winguide/platfrm2/d5/s118ab.htm, 2 pages.

*Primary Examiner*—Paul V. Kulik
*Attorney, Agent, or Firm*—Fish & Richardson PC

[57] ABSTRACT

Multimedia documents, for example, HTML pages, are created by a user in a graphic development environment running on a computer system by representing an object (e.g., an image) in a standard format while enabling the user to view and manipulate the object in a rich, native format which is different from the standard format. After the user has manipulated the object as desired, the native format representation of the object is automatically converted to the standard format and is used to represent the object in the multimedia document.

39 Claims, 31 Drawing Sheets

Start
User Selects Object — 350
Enable/Disable Editors Based on FTR File Types — 352
User Invokes Editor — 354
Does Native Version Exist? — 356
Yes: Set Version = Native — 358
No: Set Version = Web Standard — 360
Is Version Writable? — 362
No: Make Writable Working Copy — 364
Yes
Launch External Editor to Open Version — 366
Monitor FAM Status Until Change Event Detected — 368
378
Conversion Needed? — 370
Yes: Perform Conversion — 372
No
Refresh Display — 374
End

```
<!DOCTYPE HTML PUBLIC "-//W3C/DTD HTML 3.2//EN">

<HTML>

<HEAD>
  <TITLE>Welcome to Silicon Surf</TITLE>
</HEAD>

<!-------------------------------------------------------------
-------------->

<BODY BGCOLOR="#ffffff" TEXT="#000000" LINK="#004060" VLINK="#9a6524"
    ALINK="#00ffff">

<TABLE WIDTH="600" CELLSPACING="0" CELLPADDING="0">
<TR>
  <TD WIDTH="90">
    <A HREF="/Images/hp_discrete.map"><IMG ALT="[Navigation]" ISMA
P BORDER="0" SRC="/Images/hp_discrete.jpg" WIDTH="88"
HEIGHT="100"></A>
  </TD>
  <TD WIDTH="510">
    <IMG BORDER="0" ALT="Silicon Surf: The Corporate Website for S
ilicon Graphics Computer Systems"
SRC="/Images/hp_banner.jpg" WIDTH = "412" HEIGHT = "110" >
  </TD>
</TR>
</TABLE>

<TABLE WIDTH="600" CELLSPACING="0" CELLPADDING="0">
<TR>
  <TD WIDTH="430">
    <BR>
  </TD>
  <TD WIDTH="170">
    <A HREF="ss.home.page.html"><IMG BORDER="0"
ALT="Java" SRC="/Images/selector-java.gif" WIDTH = "72"
HEIGHT = "15" ></A><A HREF="hp_text.html"><IMG BORDER="0"
ALT="Text Only" SRC="/Images/selector-text.gif" WIDTH = "87"
HEIGHT = "15" ></A>
  </TD>
</TR>
<TR>
```

Fig. 3

```
<!DOCTYPE HTML PUBLIC "-//W3C/DTD HTML 3.2//EN">
<HTML>
<HEAD>
  <TITLE>WEB PAGES-R-US</TITLE>
  <META NAME="GENERATOR" CONTENT="Mozilla/3.01Gold (Win95; I) [Ne
tscape]">
</HEAD>
<BODY BGCOLOR="#FFFFFF">

<P><IMG SRC="web_r_us.gif" ALT="WEB PAGES-R-US" HEIGHT=100
WIDTH=5
50>
<HR><B><FONT SIZE=+1>Let Us Design a Web Page for you. Only
$14.95
! (text only)</FONT></B></P>

<P><IMG SRC=:banana.gif" ALT="Banana goes here" HEIGHT=215
WIDTH=3
52></P>

<P><B><FONT SIZE=+1>Each image only $5.95 extra!</FONT></B></P>

<P>Click below for more information.</P>

<P>
<HR><BR>
<B><A HREF="http://www.site.xxx">&lt;&lt; Yes, I want my own
web page.
Tell me more.&gt;&gt;<BR>

<HR></A></B>copyright 1997 Web Pages-R-Us, Inc.</P>

</BODY>
</HTML>
```

Fig. 4B

GENERATING MULTIMEDIA DOCUMENTS

BACKGROUND

This invention relates to generating multimedia documents using a computer system.

The computer system illustrated in FIG. 1—which includes mouse 15, keyboard 16, CPU 17 and CRT 18—represents a hardware setup for running software that allows a user to view and/or create multimedia documents. A multimedia document may include several different types of media arranged in a background setting to create an informative or aesthetically pleasing presentation. The media types may include text, images, movies, music or other sounds, animations, 3D virtual worlds, links to other objects, applets (self-contained executable programs written in Java—an interpreted computer language, or in the Java scripting language, JavaScript) and plug-ins (extension mechanisms for handling non-standard data types). One class of multimedia document is the hypertext-markup language (HTML) page (equivalently, a "web page"). HTML is a language used to create visually structured documents that can be viewed with a "browser"—an application for viewing and interacting with multimedia documents. A typical application for an HTML page is to publish it to a unique URL (uniform resource locator) address on the World Wide Web. This allows others—namely, either the general public or a limited group of people within an enterprise—to access the HTML page via the Internet.

FIG. 2A shows an example of a Silicon Graphics HTML page residing at the URL address http://www.sgi.com/ss.home.page.html The web page in FIG. 2A is viewed through an HTML browser (Netscape Navigator) which displays the web page in a window 20 and the corresponding URL address of the web page in address line 22. The user can specify the particular web page to be viewed by entering its URL address in the address line 22. Most web pages include links to other web pages or other resources (image files, movie files, sound files, etc.) on the internet. Each link points to a URL address associated with a document specified by the developer of the web page at the time of the page's creation. A user can access information pointed to by a link by clicking on it with a mouse cursor. In response, the browser automatically jumps to the corresponding URL address and displays the web page or otherwise accesses the resource at the specified URL. For example, when the user clicks on the link 24 in FIG. 2A labeled "company info & jobs," the browser jumps to the corresponding URL address and displays the web page listing corporate information in FIG. 2B.

Authoring web pages can be a challenging endeavor often requiring the HTML author to have extensive training and experience in the HTML programming language, which is somewhat arcane, as illustrated in FIG. 3 by the partial HTML source listing for the web page of FIG. 2A. To make web page authoring somewhat easier, visual HTML programming tools have been developed that do not require an author to understand the complexities of HTML. These tools simplify the process of developing web pages by enabling an author to generate multimedia documents through graphical user interface (GUI) abstractions and standard point-and-click cursor techniques.

FIG. 4A shows one such visual HTML page layout tool, the editor component of Netscape Navigator, providing a GUI window 40 having several different text and image manipulation tools 41 that may be used by an author along with conventional point-and-click mouse techniques to generate an HTML page in editing region 42. An author can generate a new HTML page from scratch, or edit an existing HTML page, by entering text 43 via the keyboard, importing pre-defined images 44 using various tools provided by the editor, specifying links 45 to other URL addresses, and using interactive cursor manipulation techniques to arrange and format the components in the desired fashion. Using the visual information provided by the author, the editor tool automatically generates an HTML source listing, shown in FIG. 4B, which describes the multimedia document shown in FIG. 4A.

Even with such visual HTML page layout tools, creating multimedia documents of any complexity can be a painstaking process, especially when a document contains several different media types in various formats, each requiring a different editing environment for its creation and modification. A sophisticated HTML page might contain objects of many different media types including text, images, movies, 3D virtual worlds and sounds. Each of these media types can be represented in any of several different formats—for example, images can be in any of the RGB, PNG, TIFF, GIF or JPEG formats among others, sounds can be in any of the WAV, MIDI or AU formats among others, and movies can be in MPEG-1, MPEG-2, AVI or MOV formats among others. To generate and subsequently modify the objects making up a web page, the author typically must invoke several editing programs, usually a different editor for each media type and potentially a different editor for different formats within the same media type.

Adding further to a web page author's burden is the fact that most commercially available HTML browsers support only a subset of the vast universe of formats available for the different types of media. Some HTML browsers only will have native support for JPEG and GIF formatted images, and, by means of readily available plug-ins, can be enhanced to support MPEG-1 format for movies, WAV format for sounds and VRML (virtual reality modeling language) format for 3D worlds. Consequently, an author may encounter an additional task whenever a web page component is created or edited-namely, converting objects from their native formats into standard formats understandable to a browser (i.e. "web-publishable" formats).

SUMMARY

In one aspect, multimedia documents, for example, HTML pages, are created by a user in a graphic development environment running on a computer system by representing an object (e.g., an image) in a standard format (e.g., a web-publishable format) while enabling the user to view and manipulate the object in a rich, native format which is different from the standard format. To do so, a helper application such as an external editor associated with the native format can be launched from within the graphic development environment. After the user has manipulated the object as desired, the native format representation of the object is automatically converted to the standard format and is used to represent the object in the multimedia document. The object then can be displayed in the multimedia document using the standard format.

The specific conversions to be performed, the different formats to be used for the standard and native versions of an object, and the various helper applications that are made available, all can be based on configuration parameters received from a user. The format conversion is triggered in response to a predetermined event, for example, the recognition that a new native-format representation of a multimedia component has been generated by means of a save operation performed by an external editor. The converted format of the object can be stored as a local file apart from the file containing the native format version, which can be maintained in an original file in the same or different directory. In that case, the local file is used for displaying the object in the multimedia document.

The objects that can be represented in a multimedia documents using one format (e.g., standard) and manipulated in another format (e.g., native), include inline images, plug-ins, applets, virtual worlds, text, movies, and sound. Many different variations of conversion operations are available, both between different formats of the same media type (e.g., from a RGB image to a GIF image) and between different formats associated with different media types (e.g., from a movie file to an image file). Typically, the native format of an object represents a non-web-publishable format that is functionally richer than the standard format. However, the native format may itself be web-publishable such that no conversion is required.

The launching of an external editor from within the graphic development environment for manipulating an object in a non-web-publishable format, and the corresponding automatic conversion between different representations of the object, could be repeated such that one converted representation of the object is manipulated and converted to another converted representation. This sequence of launching and converting could be repeated multiple times to create a chain of different editors and formats, all of which are available to the user.

In another aspect, a computer-based method for use with an object included in a multimedia document within an editing environment associated with a common file format, the object being associated with an application program having a different native file format, involves maintaining two files representative of the object, one file in the common file format, the other file in the different native format, and synchronizing content of the two files in response to work done on the document by a user working in the editing environment.

The multimedia authoring tools described here provide simple yet powerful mechanisms that allow authors to view and manipulate the content components used in creating multimedia documents rapidly, easily and interactively. Silicon Graphics' Cosmo™ Create HTML page layout environment provides a user of a computer system, for example, a web page author, with visual and interactive tools that allow the author quickly and easily to generate complex HTML pages having a rich variety of media types based on a wide variety of formats. Cosmo™ Create enables a web page author to directly and seamlessly invoke different editing environments so that the multimedia components making up a web page can be manipulated in their native formats. As a result, authors can use media formats having rich functionality even though such formats may be non-web publishable. Moreover, the Cosmo™ Create architecture is fully extensible thereby allowing an author to specify and use virtually any editing environment according to personal needs and tastes.

Authors are freed from the administrative burdens associated with maintaining different versions of an object and having to convert objects to web-publishable formats. Authors can create web pages that include several different media types and formats, many of which may require specialized editing environments, and still not have to worry about manually maintaining copies of the various multimedia components in standard, web-publishable formats. In response to a document save operation, Cosmo™ Create will automatically and transparently convert an object to a web-publishable format and will use the converted object to maintain dual file versions—e.g., an original, source format version and a publishable version. By enabling authors either to rely on the default conversion parameters or to customize the parameters as desired, the flexibility and power of the HTML page layout environment is further enhanced.

Other advantages and features will become apparent from the following description, including the drawings and claims.

DESCRIPTION OF THE DRAWINGS

FIG. 3 is a portion of the HTML source listing for the web page shown in FIG. 2A.

FIG. 4B is the HTML source listing for the web page shown in FIG. 4A.

DETAILED DESCRIPTION

Figure 1:
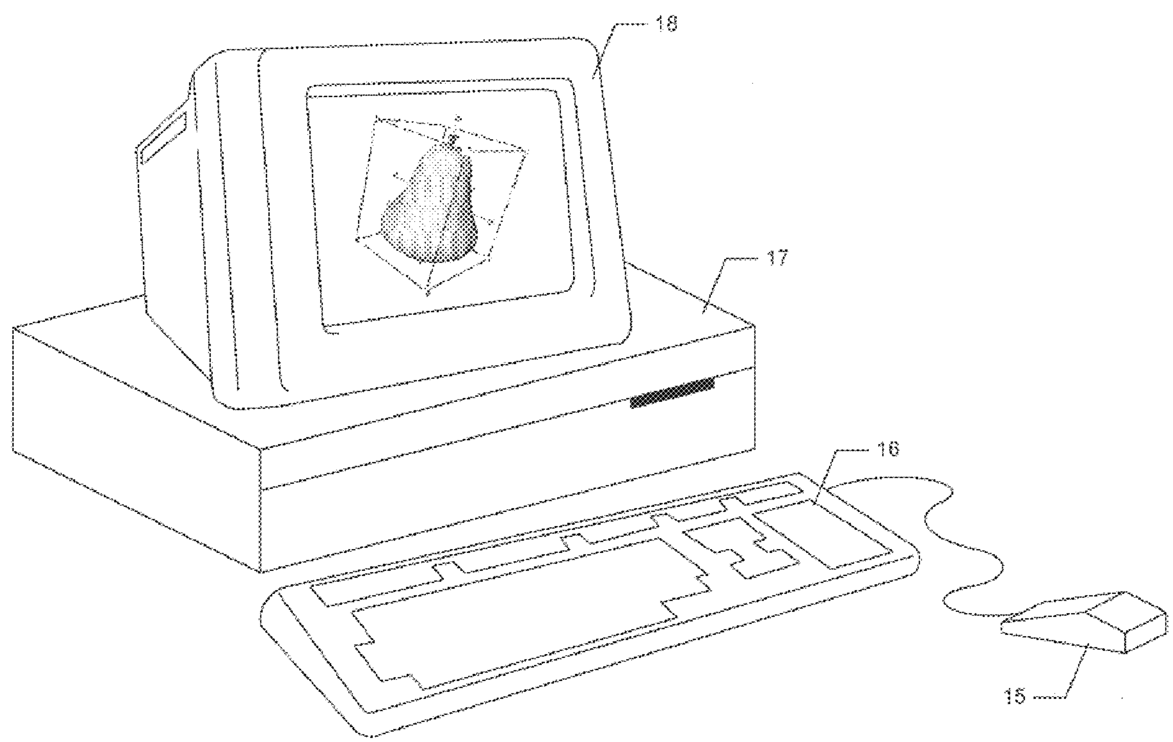
FIG. 1 is a computer system displaying an image.
Figure 2A:
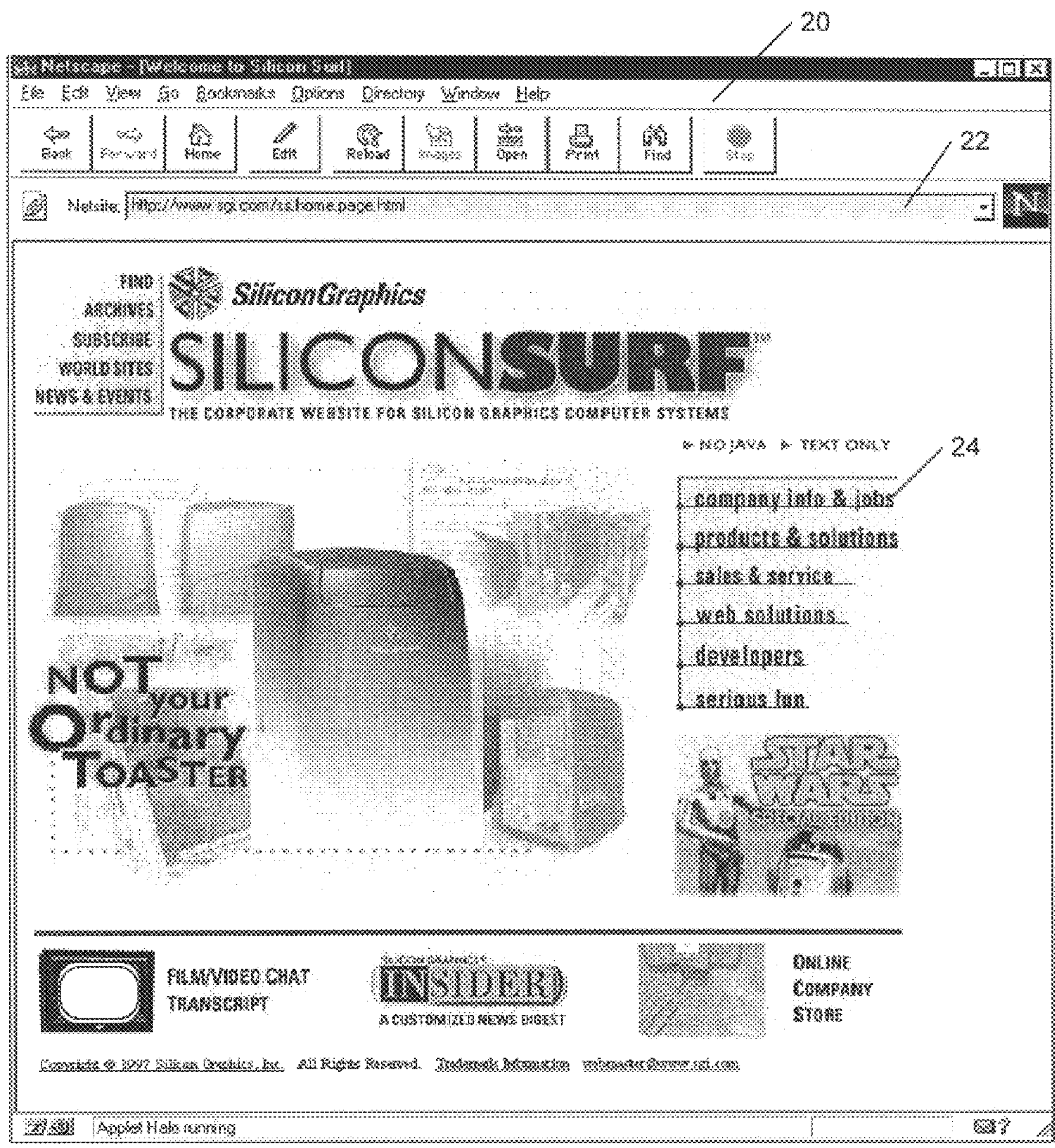
FIGS. 2A and 2B show examples of web pages in a browser window.
Figure 2B:
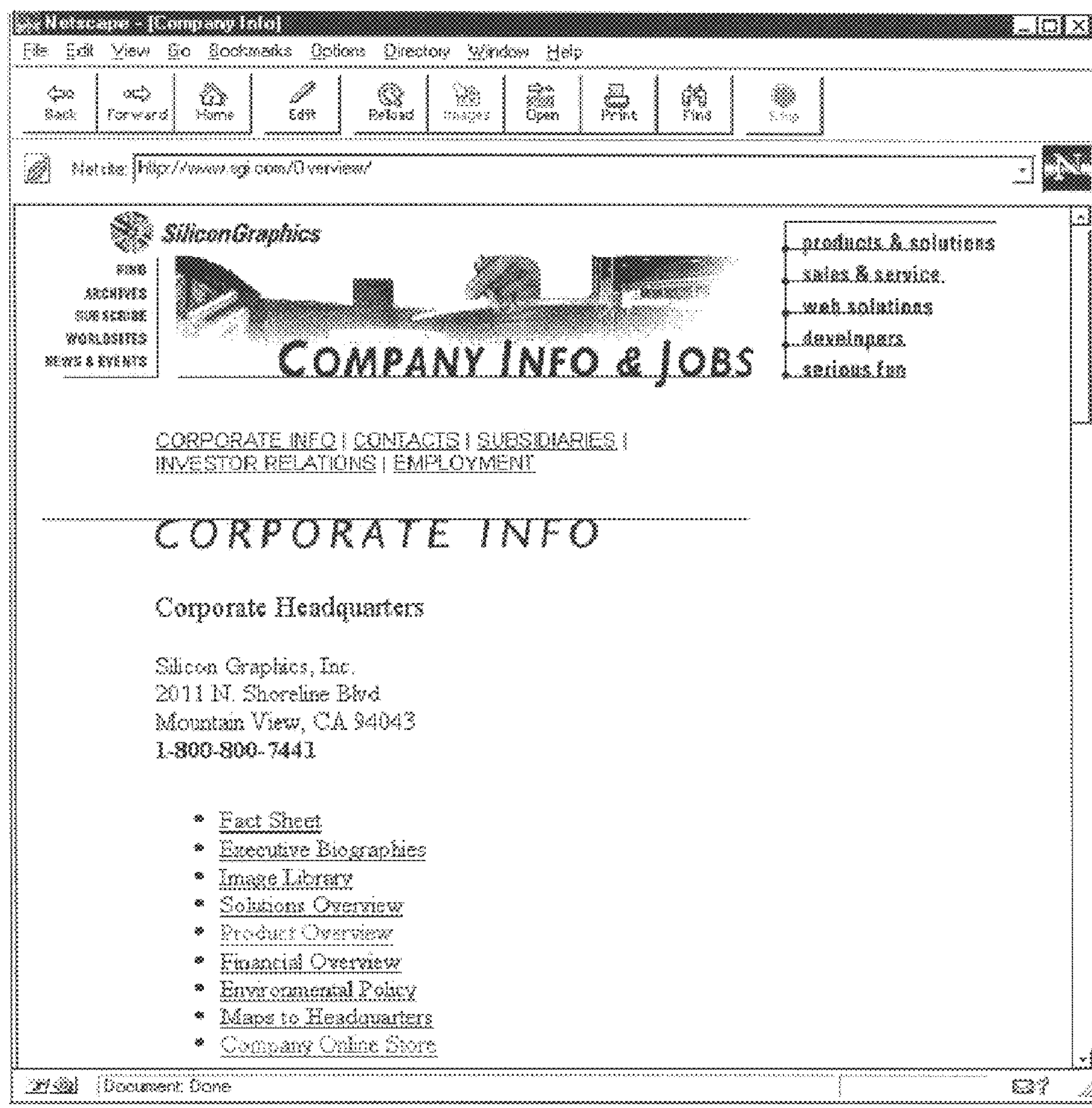
Figure 4A:
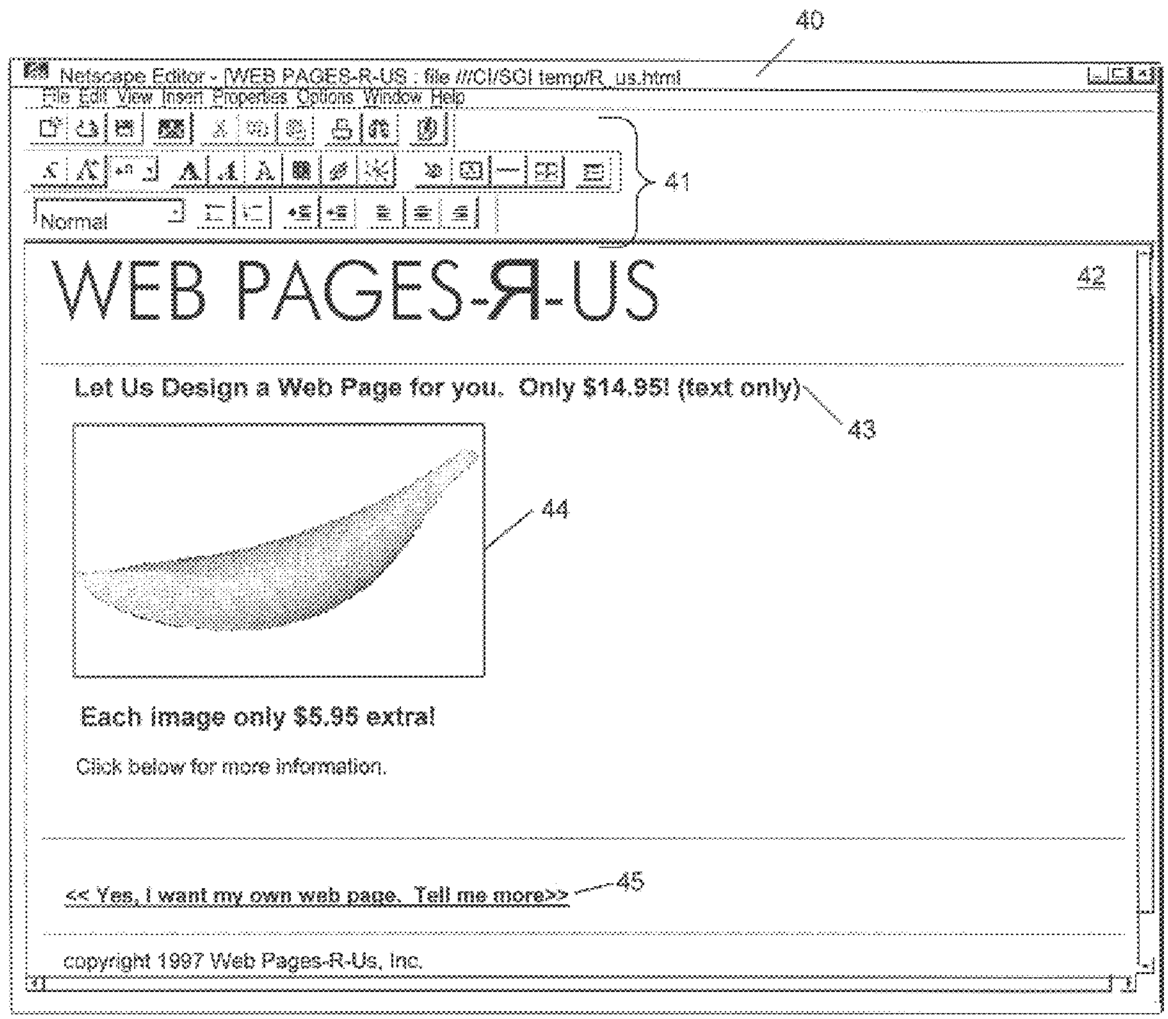
FIG. 4A shows an example of a web page being created in a visual HTML page layout window.

An author using conventional HTML page layout tools to generate web pages is faced with a dilemma: either the author may use media formats that provide a rich body of functionality for generating multimedia components, and thereby incur the administrative overhead associated with manually managing those rich media types, or the author may simplify the page layout task by using standard HTML browser formats and thereby sacrifice functionality. Silicon Graphics™ Cosmo™ Create HTML page layout tool reduces the effect of this dilemma by enabling authors to create multimedia content using sophisticated content development tools that support rich media formats but without the associated administrative headaches. By using data abstractions and interactive GUI techniques, Cosmo™ Create provides an author with direct and seamless access to virtually any development environment for creating or editing multimedia objects of the desired format. At the same time, Cosmo™ Create automatically manages different versions of the multimedia components (e.g., a rich, native version and an alternative, standard browser version) and performs the conversion between the two versions whenever a multimedia component is created, modified or otherwise manipulated by the author. As a result, an author's ability to create informative and aesthetically pleasing multimedia documents quickly and easily is enhanced dramatically. A copy of the online documentation provided with Cosmo™ Create is available from Silicon Graphics, Inc. of Mountain View, California. Further information on Cosmo® Create is available at the following URL on the world wide web and is incorporated by reference: http://www.sgi.com/Products/SGIHelp$_{13}$Hub/CosmoCreate_1.0.html A description of how Cosmo™ Create seamlessly integrates HTML page layout functionality with disparate media formats and editing environments is provided with reference to the flowchart of FIG. 5. While in the HTML page layout environment, an author selects an object—for example, an image, applet or plug-in—that is to be edited or otherwise manipulated (step 350). In response, Cosmo®Create checks the file types of the file associated with the native version of the object and the file associated with the standard, web-publishable version of the object. File types are determined using the file typing rules (FTR) described in U.S. Pat. No. 5,226,163 (Karsh et al.), entitled "FILE CHARACTERIZATION FOR COMPUTER OPERATING AND FILE MANAGEMENT SYSTEMS," which is incorporated by reference. The appropriate external editors are then enabled or disabled based on the identified FTR file types by graying out or making available the appropriate editor buttons in the GUI (step 352).

Using interactive GUI techniques (e.g., by clicking on one of the editor buttons that has not been grayed-out), the author can then initiate an "out-of-place" editing sequence by causing Cosmo™ Create to invoke the particular editing environment that corresponds to the media type and format of the selected object (step 354). Out-of-place editing refers to the fact that editing of an object using an external editor can be initiated directly from within Cosmo™ Create and need not be initiated from within the external editing environment itself.

Cosmo™ Create then determines which version of the object should be used (step 356). If a native format version of the object exists it will be used in the editing sequence (step 358) otherwise the standard, web-publishable format version of the object will be used (step 360). Next, Cosmo™ Create checks to see whether the file containing the version being used for editing (native or standard) is writable or whether it is write-protected (step 362). If write-protected, Cosmo™ Create automatically generates a writable copy of the file in a working directory and uses it for the editing sequence (step 364).

Cosmo™ Create then launches the appropriate external editor corresponding to the version of the object that is being used for editing (step 366). While the external editing environment is active, the author may continue to create and edit components of the HTML page undergoing construction in Cosmo™ Create. An external editor can remain active concurrently with Cosmo™ Create during the HTML page layout session allowing the author to alternate as desired between the Cosmo™ Create window and one or more editor windows while a web page is being developed.

Each time the author causes the external editor to perform a save operation during an out-of-place editing sequence, a system component referred to as the file alteration monitor (FAM) detects the occurrence of the save operation and notifies Cosmo™ Create of the identity of the newly saved file (step 368). The FAM is a server to which clients subscribe for on-the-fly notice of alterations to files and directories in the computer system. A detailed description of the FAM is set forth in U.S. Patent No. 5,287,504, entitled "FILE ALTERATION MONITOR FOR COMPUTER OPERATING AND FILE MANAGEMENT SYSTEM," which is incorporated by reference.

Upon receiving notice that an object file has been altered, Cosmo™ Create determines whether the newly altered file needs to be converted, and if so, into what format (step 370). The first inquiry is to see if files of the FTR type under consideration have been converted and saved previously. If so, the file is automatically converted into that same format and saved to a "local" directory, a working directory used by Cosmo™ Create for developing the web page (step 372). If files of that FTR type have not been previously converted, Cosmo™ Create checks a list of conversion rules that it maintains and uses the appropriate rule, if any, to perform the conversion and saves the converted file to the local directory (step 372). The list of conversion rules includes default standard formats that can be modified by the author as desired based on personal preferences. The original file generated by the save operation of the editor remains intact and undisturbed in an "original" directory, a directory specified by the author for use with the particular editor being used to create and modify objects.

After Cosmo™ Create has converted (if necessary) and saved a local copy of the object file, the Cosmo™ Create window is refreshed to display the page with the altered object (step 374). Throughout this process, the external editor continues to be active and available to the user. As indicated by the path 378 connecting step 374 (refresh display) to step 368 (monitor FAM), the steps of manipulating an object in an external editor, performing file save operations while in the editor, determining the existence of an updated version of a file, performing any necessary conversions, and refreshing the screen display can be performed repeatedly until the object and the web page in which it appears have the desired appearance.

Figure 5:
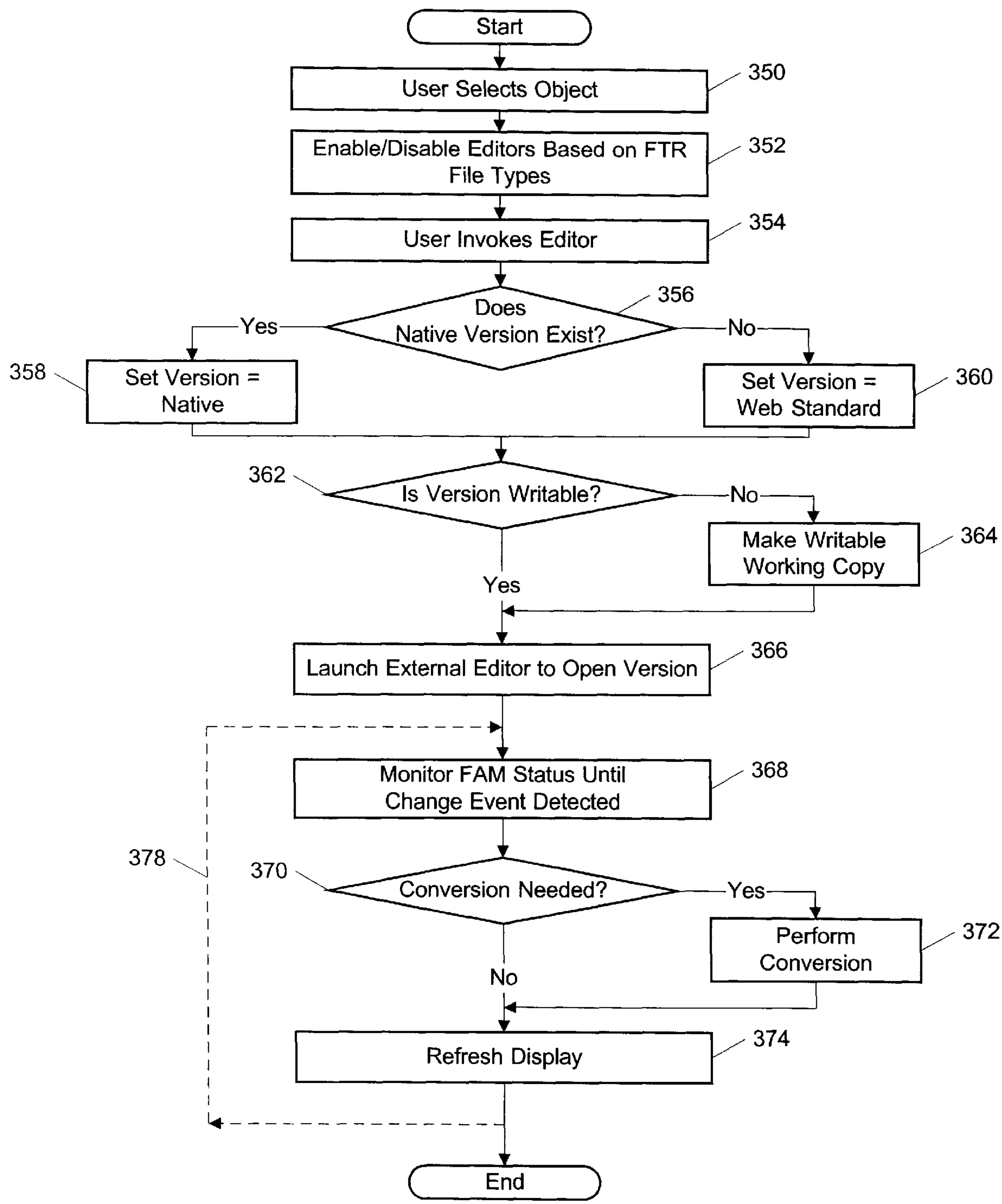
FIG. 5 is a flowchart of an out-of-place editing sequence.

Although not shown in FIG. 5, Cosmo™ Create also monitors whether an external editor has terminated or otherwise has ceased to be available. In that case, Cosmo™ Create removes from the FAM any pending request it may have for monitoring file saves from the unavailable editor, and cleans up information used by Cosmo™ Create to track an editing session for that editor. These operations reduce resource usage and free up available working space.

The automatic file conversion and management performed by Cosmo™ Create streamlines and simplifies the HTML page layout process considerably. Cosmo™ Create automatically maintains two different versions of the same object: an original version having the format used by the editor with which the object was created in the first instance and an alternative, web-publishable version. This allows authors to use virtually any desired editing environment without regard to whether the format used by that editor is web-publishable. Moreover, because this file managing is accomplished transparently, the author is freed from the administrative burden of manually converting between formats and maintaining dual versions for each object within an HTML page. A more detailed explanation of out-of-place editing is set forth below with reference to example screen shots from Cosmo™ Create.

Figure 6:
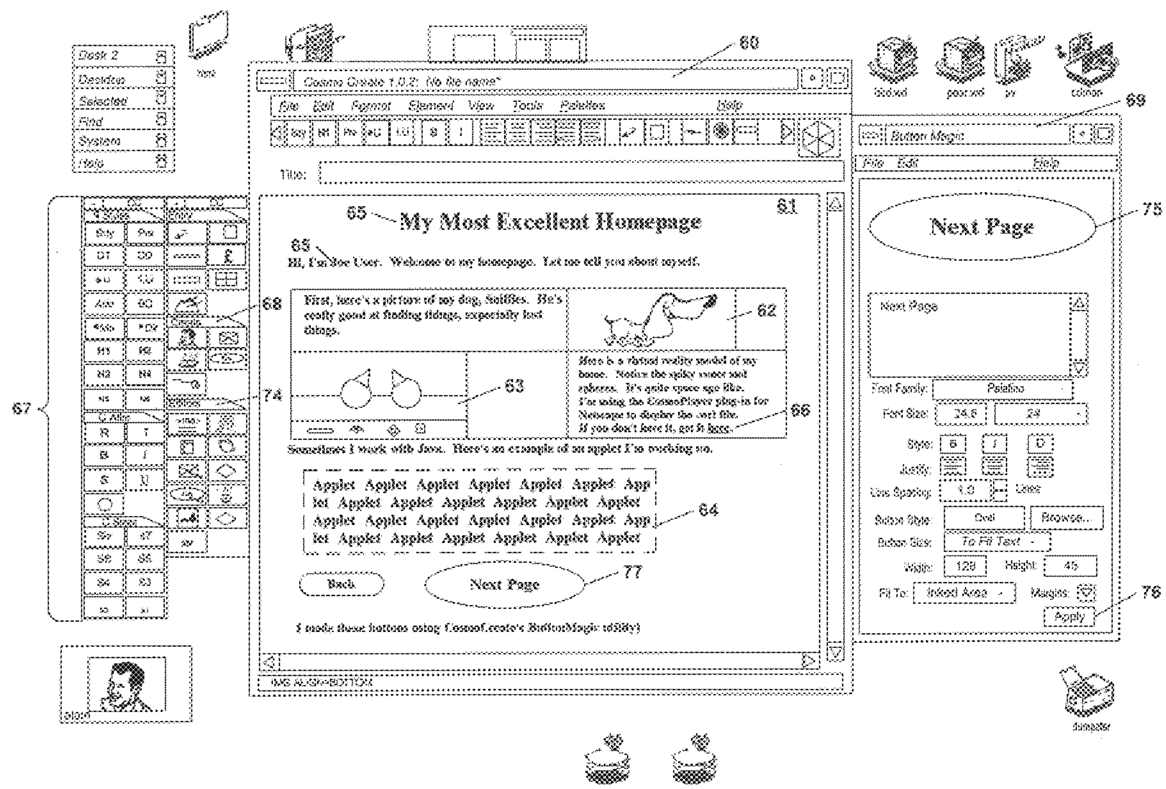
FIG. 6 shows the Cosmo™ Create HTML page layout environment.

FIG. 6 is a screen shot of a Cosmo™ Create window 60 showing a web page undergoing development in editing display area 61. This web page incorporates several different features and media types including various colors, text 65, image 22, plug-in 63, applet 64, and link 66. Image 62, plug-in 63 and applet 64 represent three different types of "inlines"—objects that appear directly within a web page rather than simply being linked to the page. The author can manipulate these inlines and other objects (e.g., links and text) as desired using the different tool panels indicated generally at 67. These tools enable an author to add colors and text, import, create and edit objects, change characteristics of objects, and arrange objects as desired.

Figure 7:
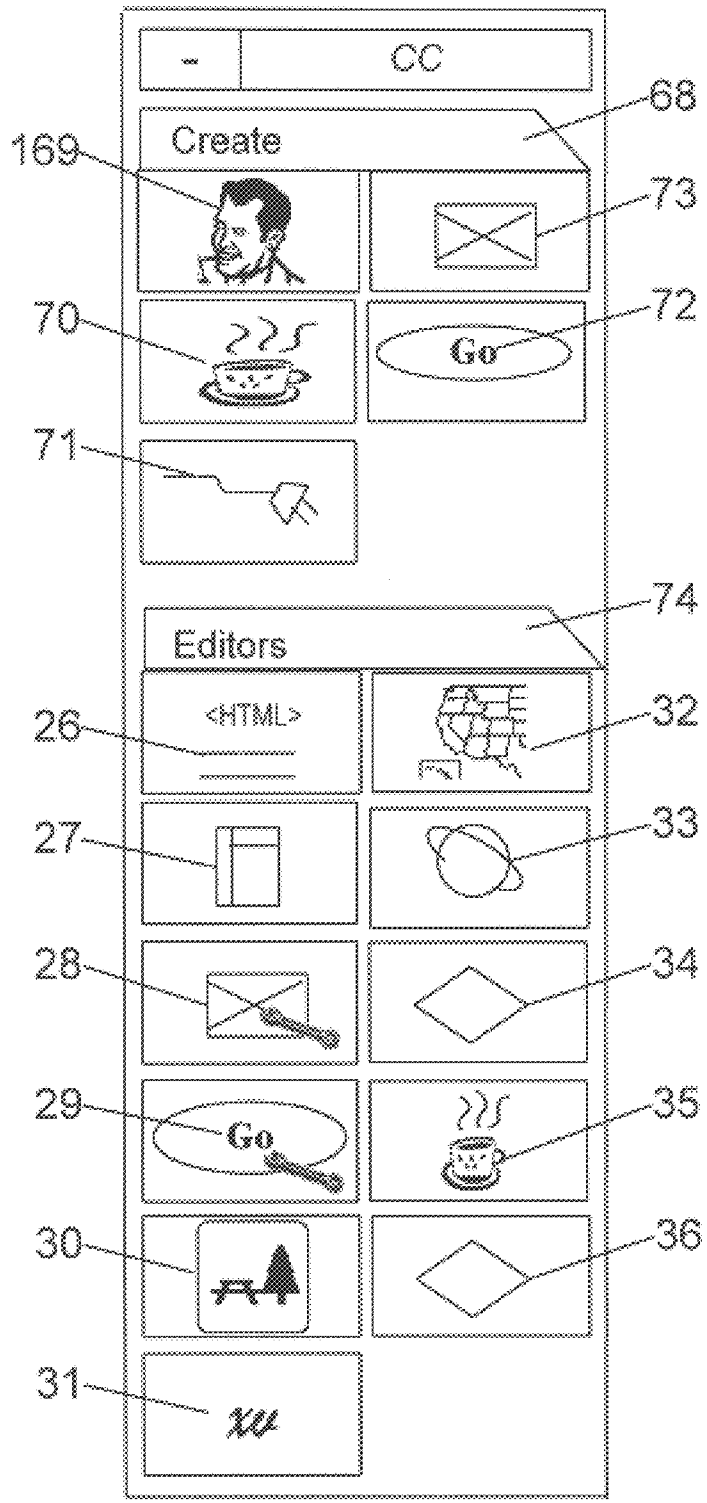
FIG. 7 shows Cosmo™ Create's object creator and editor palettes.
Figure 8:
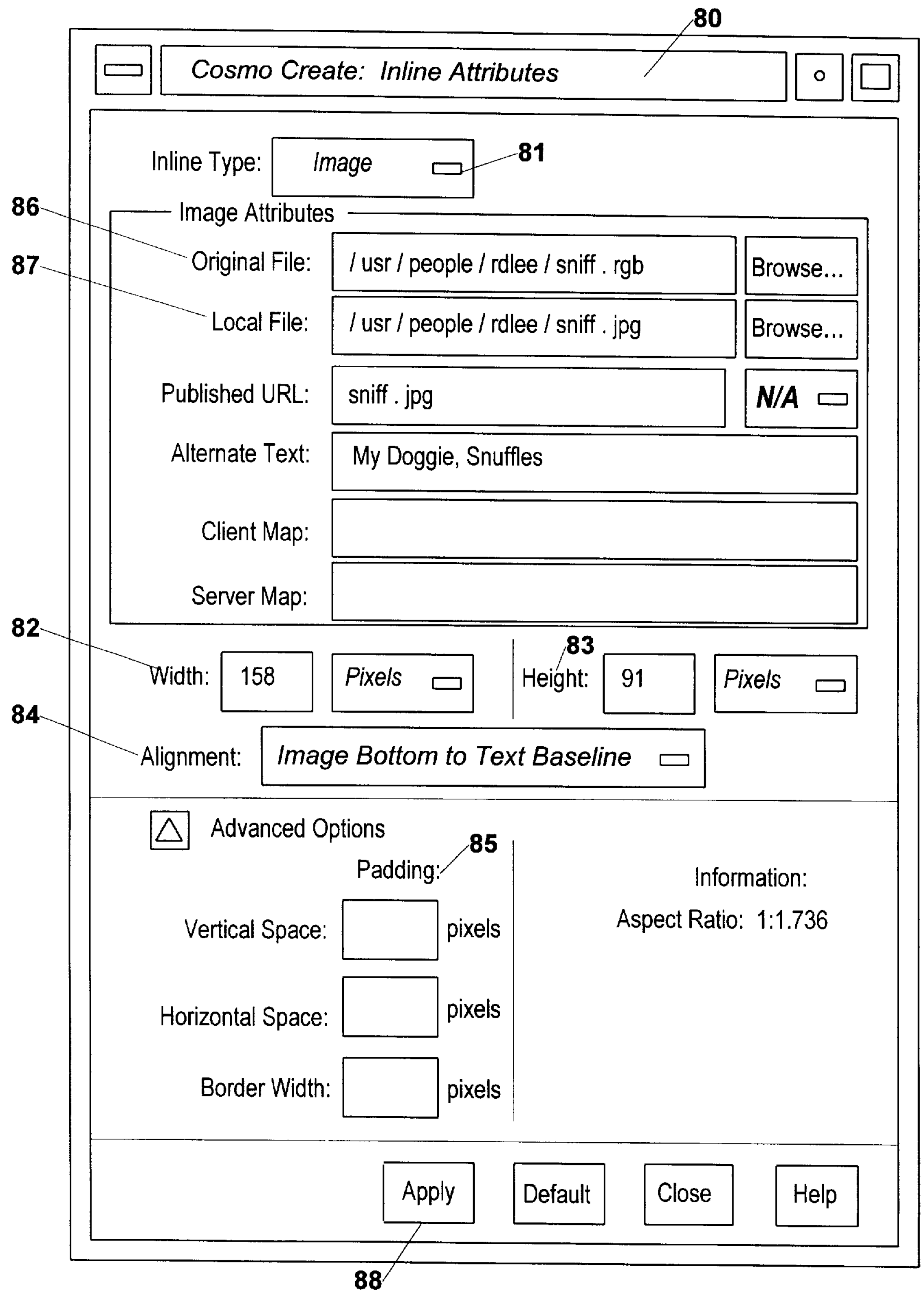
FIG. 8 shows an inline attributes dialog for an image in the HTML page shown in FIG. 6.

Two of these tools, the object creators palette 68 and the object editors palette 74 are shown in more detail in FIG. 7. The object creators palette 68 has buttons for creating five different types of objects: images, applets, plug-ins, buttons and whitespace. To create an image, the author clicks the create image button 169 and then manipulates the mouse to graphically define the area on the web page that the image is to occupy. In response, the inline attributes dialog 80 shown in FIG. 8 is launched with the "Inline Type" 87 set to "image." The inline attributes dialog 80 allows an author to insert and modify various attributes of the newly created image, for example, its width 82, height 83, alignment 84 and padding 85. The author enters information in the inline attributes dialog to specify the name of the original file 86 that contains the rich, native format version of the image and the name of the local file 87 that will contain the alternative, web-publishable version of the image.

Figure 9:
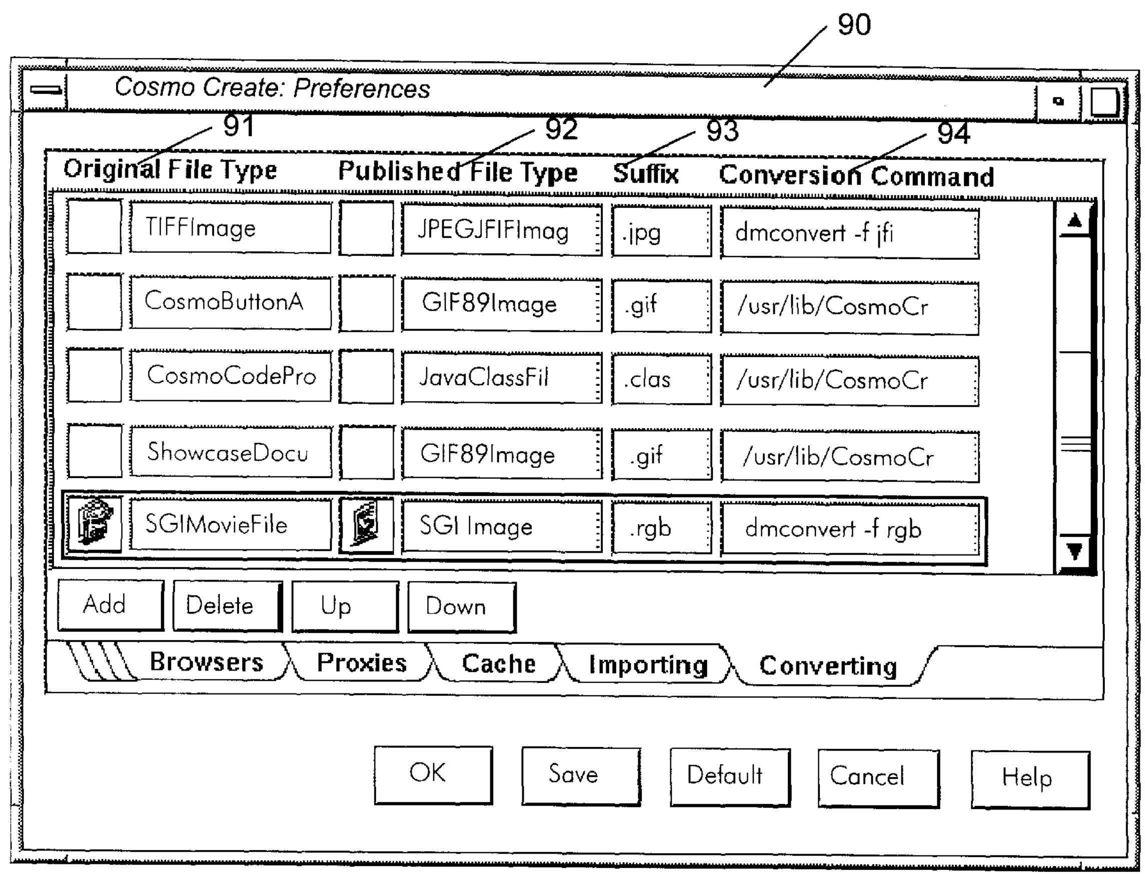
FIG. 9 shows a converting preferences panel for the HTML page shown in FIG. 6.

After the desired information has been entered in the inline attributes dialog, the author clicks Apply 88. In response, Cosmo™ Create automatically converts the original file /usr/people/rdlee/sniff.rgb from its native format (RGB) to a web-publishable format (JPEG) based on the conversion parameters specified in the converting preferences panel 90 shown in FIG. 9. The converting preferences panel 90 allows the author to set the original file type 91, the published FTR file type 92 (i.e., the format that will be used in the web page), the suffix 93 and the conversion command 94 (i.e., a command or executable file that, when executed, will perform the actual conversion). The author may rely on the default conversion parameters or may specify custom conversion parameters. Moreover, the converting preferences panel enables Cosmo® Create to support new file types simply by creating a conversion utility for the new file type and specifying the appropriate information in the converting preferences panel. Following conversion, a converted-format version of the object is stored at the local file pathname 87 specified in the inline attributes dialog (FIG. 8).

Figure 10:
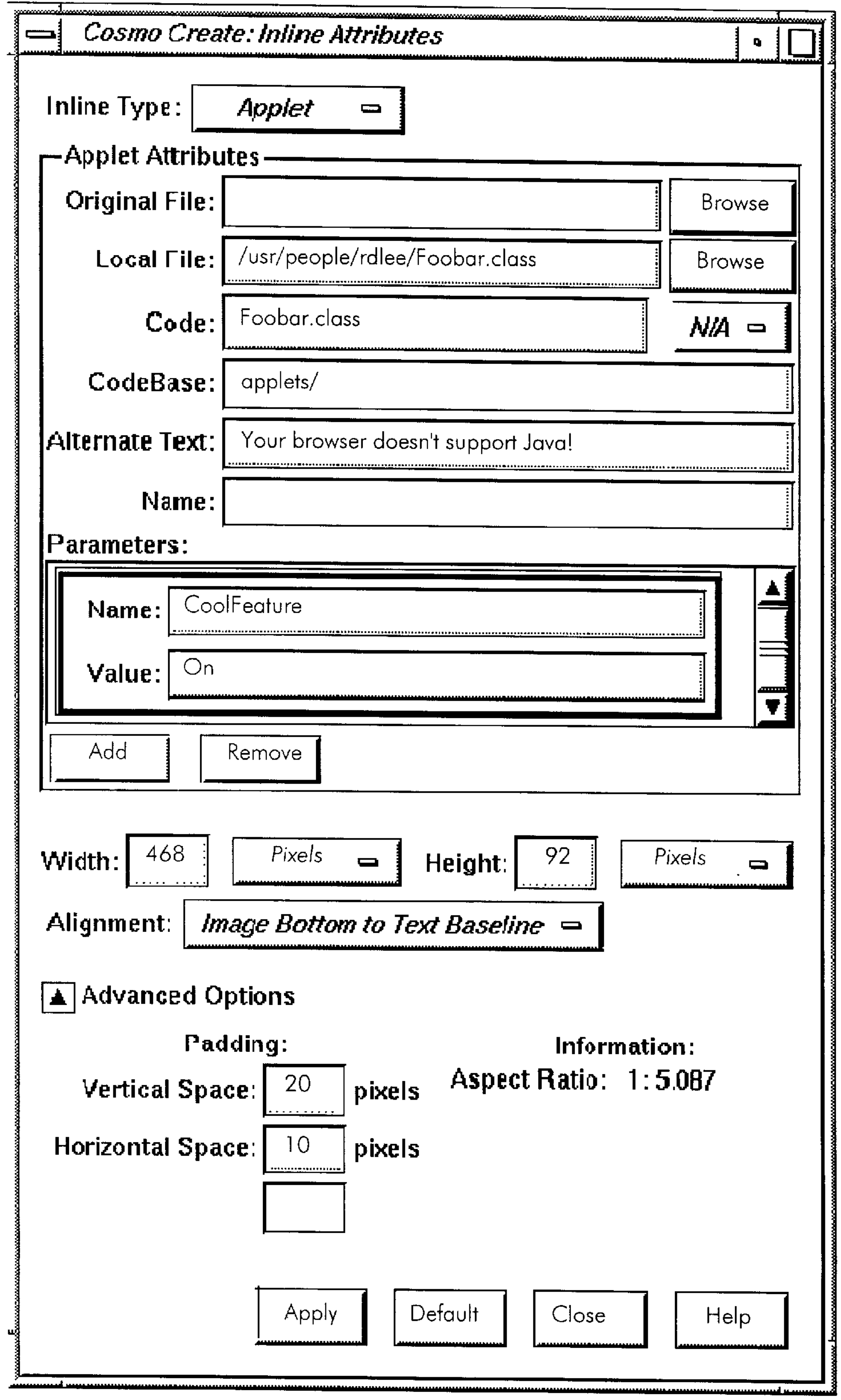
FIG. 10 shows an inline attributes dialog for an applet in the HTML page shown in FIG. 6.
Figure 11:
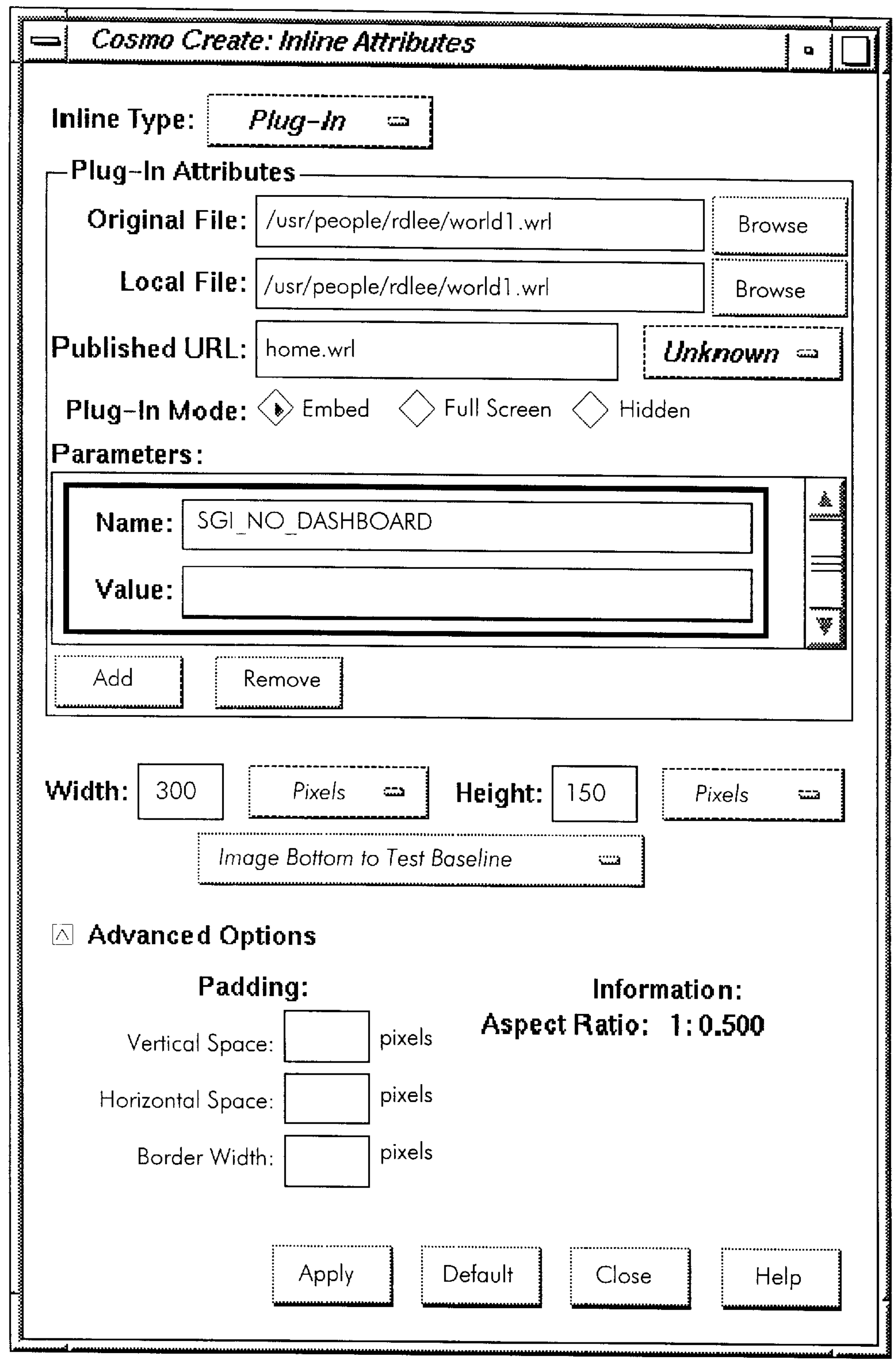
FIG. 11 shows an inline attributes dialog for a plug-in in the HTML page shown in FIG. 6.

The author can create inlines of the other types—for example, applets or plug-ins—by clicking on buttons 70 and 71, respectively (FIG. 7). In response, an inline attributes dialog specifying the appropriate inline type (either "applet" as shown in FIG. 10 or "plug-in" as shown in FIG. 11) is launched so the author can enter original and source file path names and specify various attributes associated with the inline type under consideration.

Another inline type, "whitespace," can be created by clicking on the create whitespace button 73 in the object creators palette 68. Whitespace inlines specify a blank region on the HTML page which may be used to enhance readability of the page or otherwise enhance its appearance.

To create a "button" (a selectable visual abstraction to which other resources can be linked), the author clicks on the button creator 72 and uses the mouse to drag out a region 77 in the web page in which the button will appear. In response, Cosmo™ Create launches "Button Magic," an editing environment for creating button objects. As shown in FIG. 6, the Button Magic window 69 provides several different GUI abstractions that allow the author to visually specify button attributes such as button shape and size, as well as attributes of the text that will appear on the button. An image 75 of the current rendition of the button is shown at the top of window 69 as it undergoes construction. When the button is complete, the author clicks on Apply 76 and the button appears in the web page in the region 77 previously specified by the author.

Figure 12:
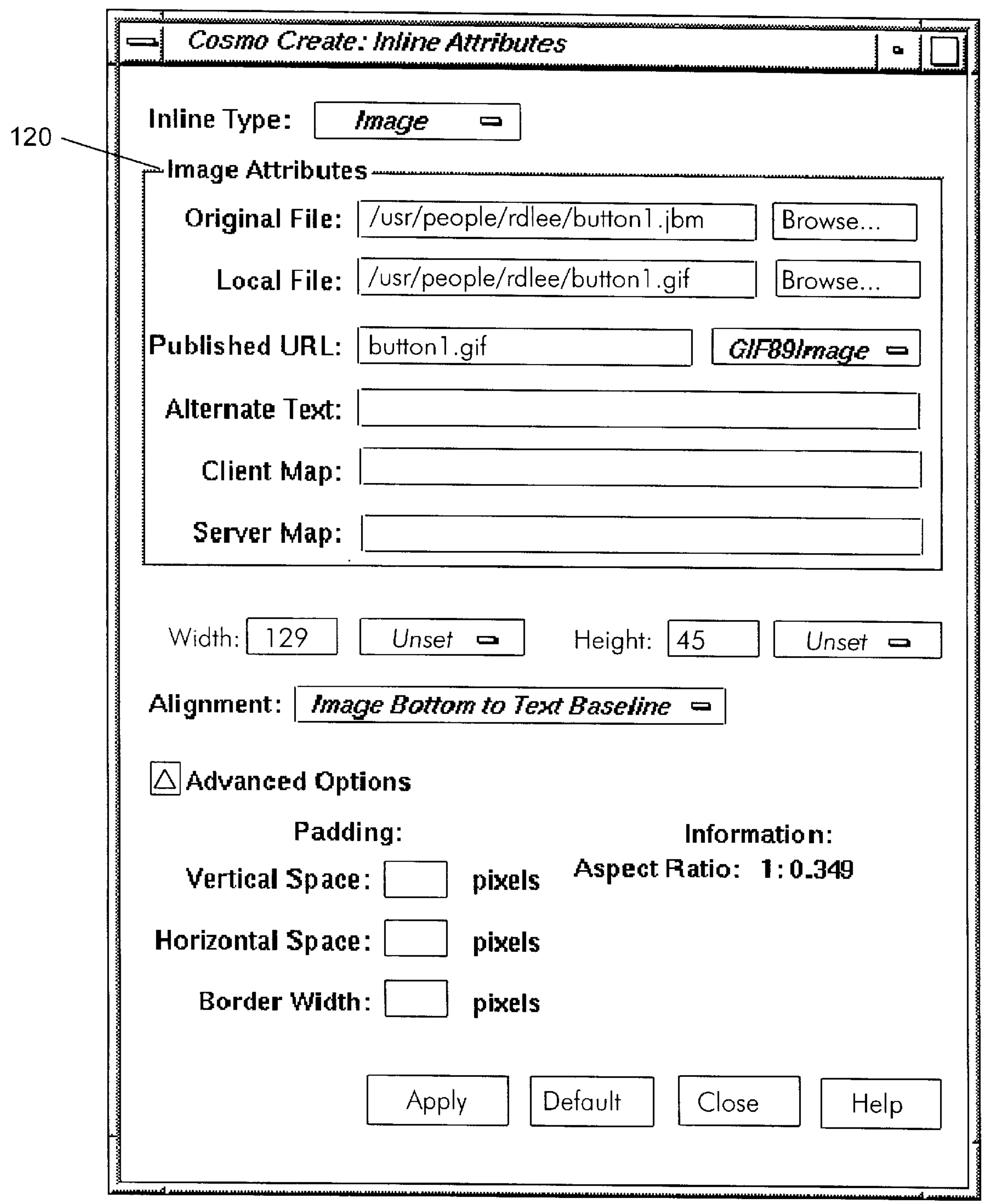
FIG. 12 shows an inline attributes dialog for button in the HTML page shown in FIG. 6.
Figure 13:
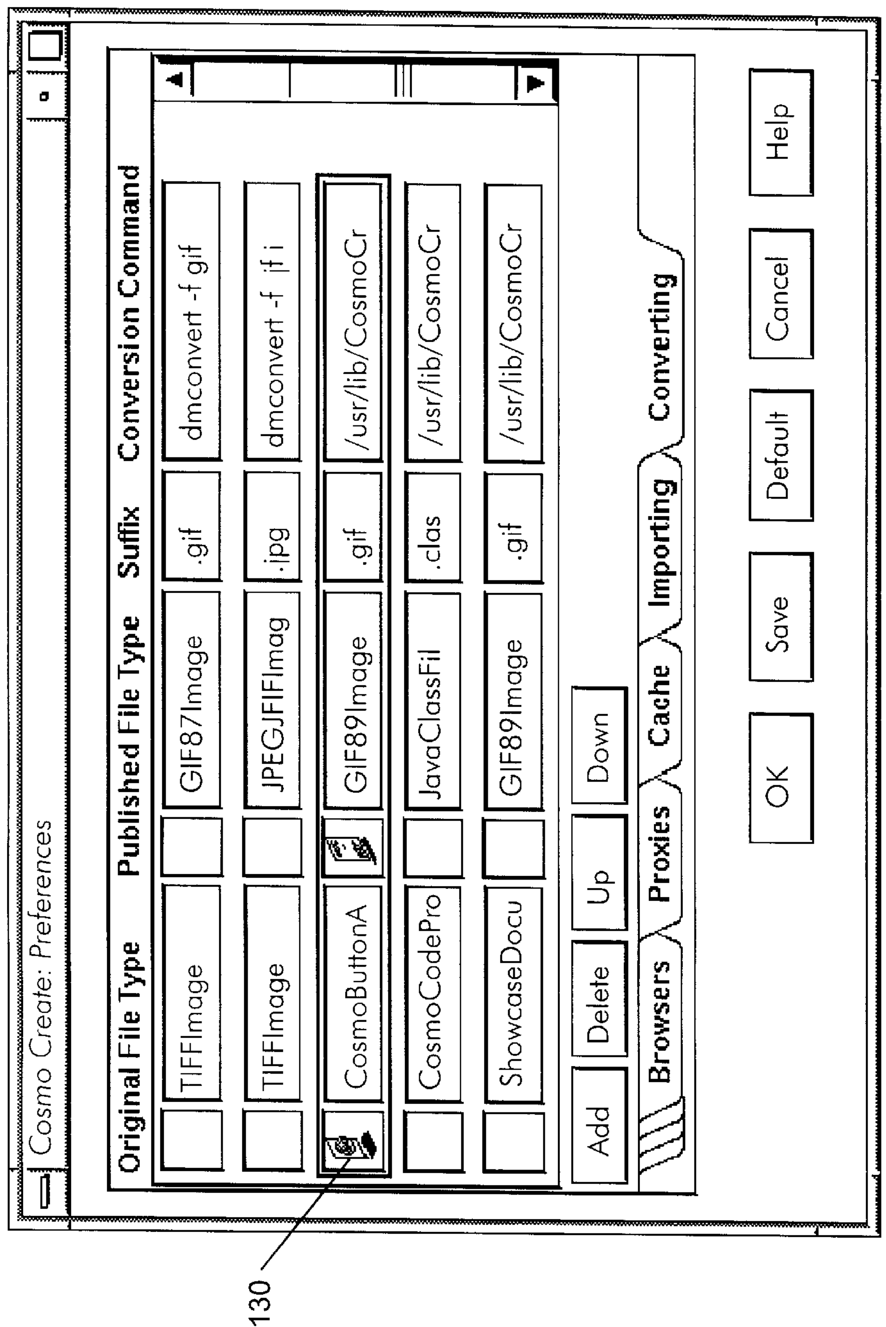
FIG. 13 shows a converting preferences panel for the HTML page shown in FIG. 6.

A button is treated as an image inline and thus has a set of corresponding inline attributes 120, shown in FIG. 12, and a set of corresponding conversion preferences 130, shown in FIG. 13. Based on the inline attributes and conversion preferences specified in this example, the newly created button is converted from its native format, "JBM" to "GIF," a standard HTML format and saved at the designated local file location. "JBM" refers to "Jim's Button Magic" files, which are in a non-standard (i.e., non-web-publishable) format.

Figure 14:
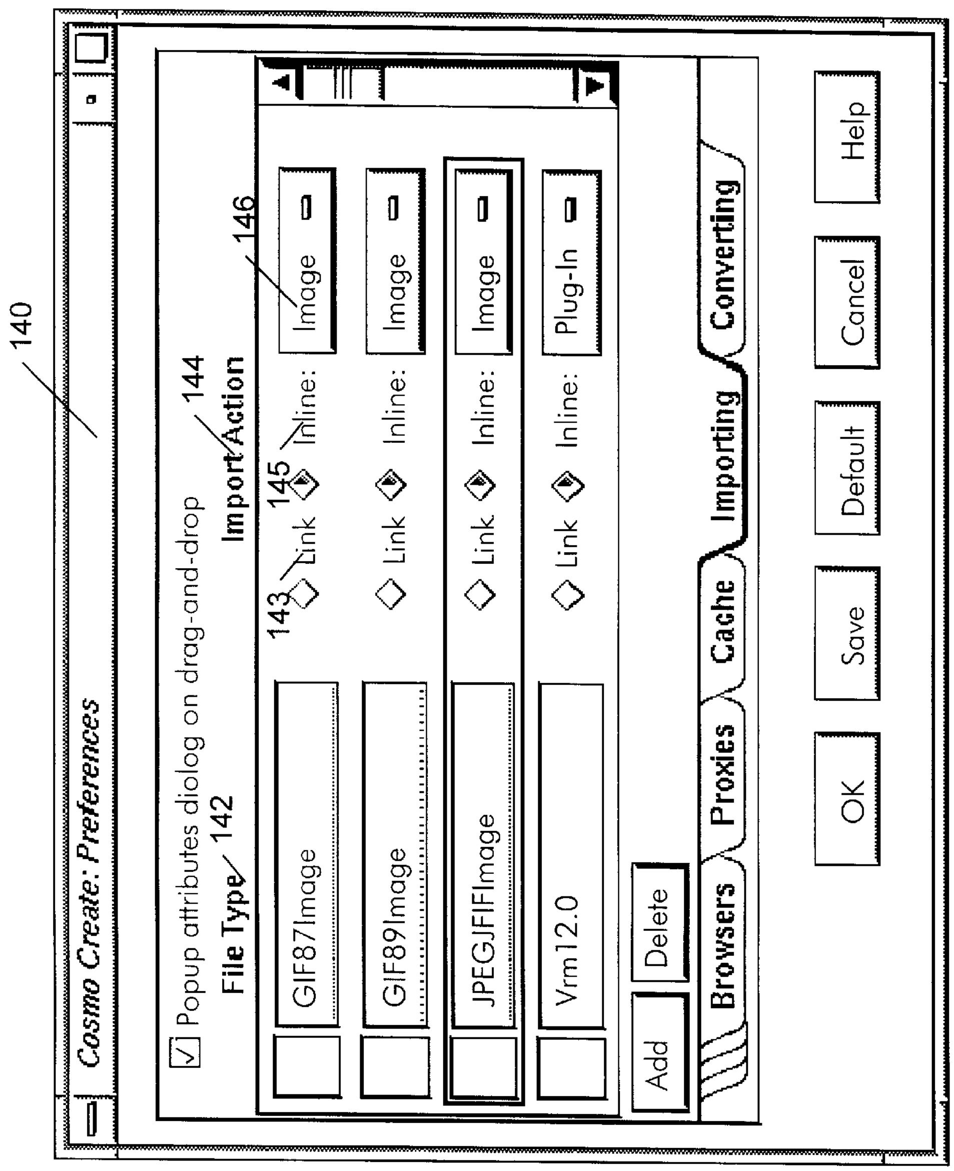
FIG. 14 shows an importing preferences panel for the HTML page shown in FIG. 6.

Previously created objects may be imported into a specified location on a web page using the "insert" command. Certain operations can be performed on an object as it is being imported by presetting the desired values in the importing preferences panel 140 shown in FIG. 14. For each object file type 142, the author can specify ahead of time whether the object is to be imported as an inline or as a link by preselecting either the Link button 143 or the Inline button 145. For those objects that are to be imported as inlines, the author further may specify the type of inline 146 (image, plug-in or applet) as which the object should be treated.

Files also can be imported into Cosmo™ Create simply by clicking on a file's icon with the mouse and dragging it into the Cosmo™ Create editing window. When this occurs, Cosmo™ Create automatically converts the file, if necessary, based on a list of default conversion rules specified in the conversions preference panel. If more than one conversion rule exists for a particular FTR file type (e.g., one rule for converting RGB files into GIF files followed by a rule for converting RGB into JPEG files), Cosmo™ Create will use the first conversion rule encountered in the list of rules (in this example, the RGB to GIF conversion rule). Users can change the rules in the list of conversion rules and their relative order by means of a drop down menu (not shown). Moreover, the user can import preexisting subject matter into a web page by changing the name of the original source file associated with an inline, as specified in the inline's attribute panel (e.g., field 86 in FIG. 8).

Once the desired objects have been created or imported they can be edited using the object editors palette 74, which as shown in FIG. 7, provides an author with several default "helper applications" represented by buttons 26–36. Additional helper applications can be added to the object editors palette to allow the author to manipulate objects from within Cosmo™ Create using virtually any desired editing environment. By clicking on the appropriate one of the default buttons in the editors palette, the author can launch any of the following eight editing environments: Button Magic for editing a previously created button; Cosmo™ Worlds for creating 3D virtual world plugins; a sound editor for adding sounds to the web page; the Image Works, Enhance, or xv editors for editing images; Movie Maker for adding movies to the web page; and Showcase, a multimedia authoring and presentation tool. Buttons for an HTML editor for editing raw HTML source code and a frames editor for adding frames to the web page also are made available to the author. The eleventh default button allows the author to bring up the inline attributes panel and modify the attributes of an inline previously created or imported.

The eight default helper applications presented by the editor palette supply authors with a wide variety of tools for creating and editing multimedia content. The variety of available tools is widened further by the fully extensible nature of the editor palette. The connection is very flexible so that any existing editor can be added to Cosmo™ Create. Because virtually all applications have "open" and "save" functionality, integrating applications with the FAM method of synchronization is straightforward. Specifically, the editor palette can be extended to include other editor applications by editing the PiHelperAppDB.txt file located in the /usr/lib/CosmoCreate/plugins directory. This file has entries thatdescribe the name and type of editor application to be added, how to launch the editor application, the editor application's native FTR file type and other FTR file types on which the application is capable of operating. A detailed description of the format of PiHelperAppDB.txt entries can be found in the Cosmo™ Create online help.

Providing this high degree of flexibility enhances the power and efficiency of the Cosmo™ Create HTML page layout environment because authors are able to use, directly from within Cosmo™ Create, the specific applications that are "just right" for the task at hand.

Figure 15:
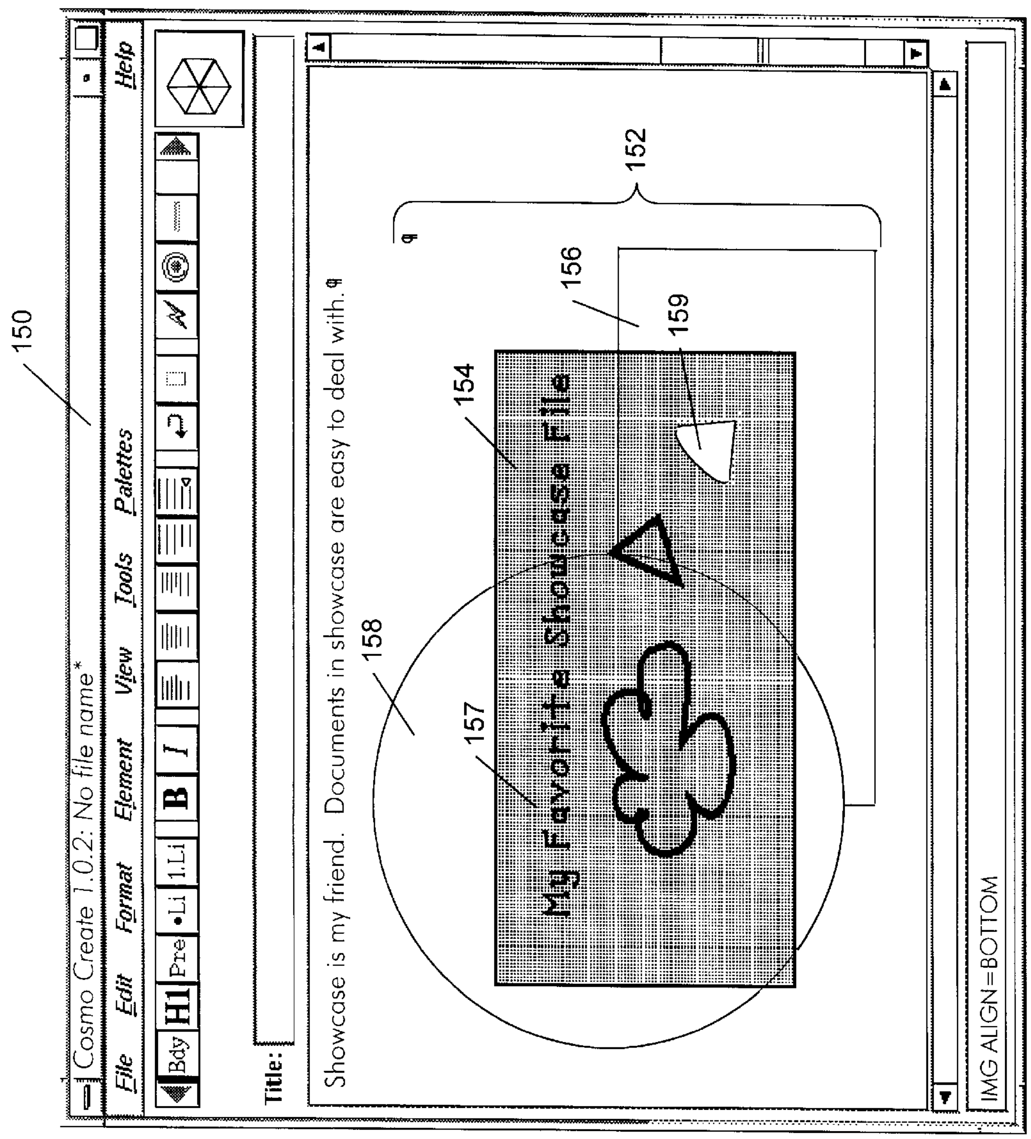
FIG. 15 shows an HTML page undergoing development in the Cosmo™ Create HTML page layout environment including an image created with the Showcase multimedia development tool.
Figure 16:
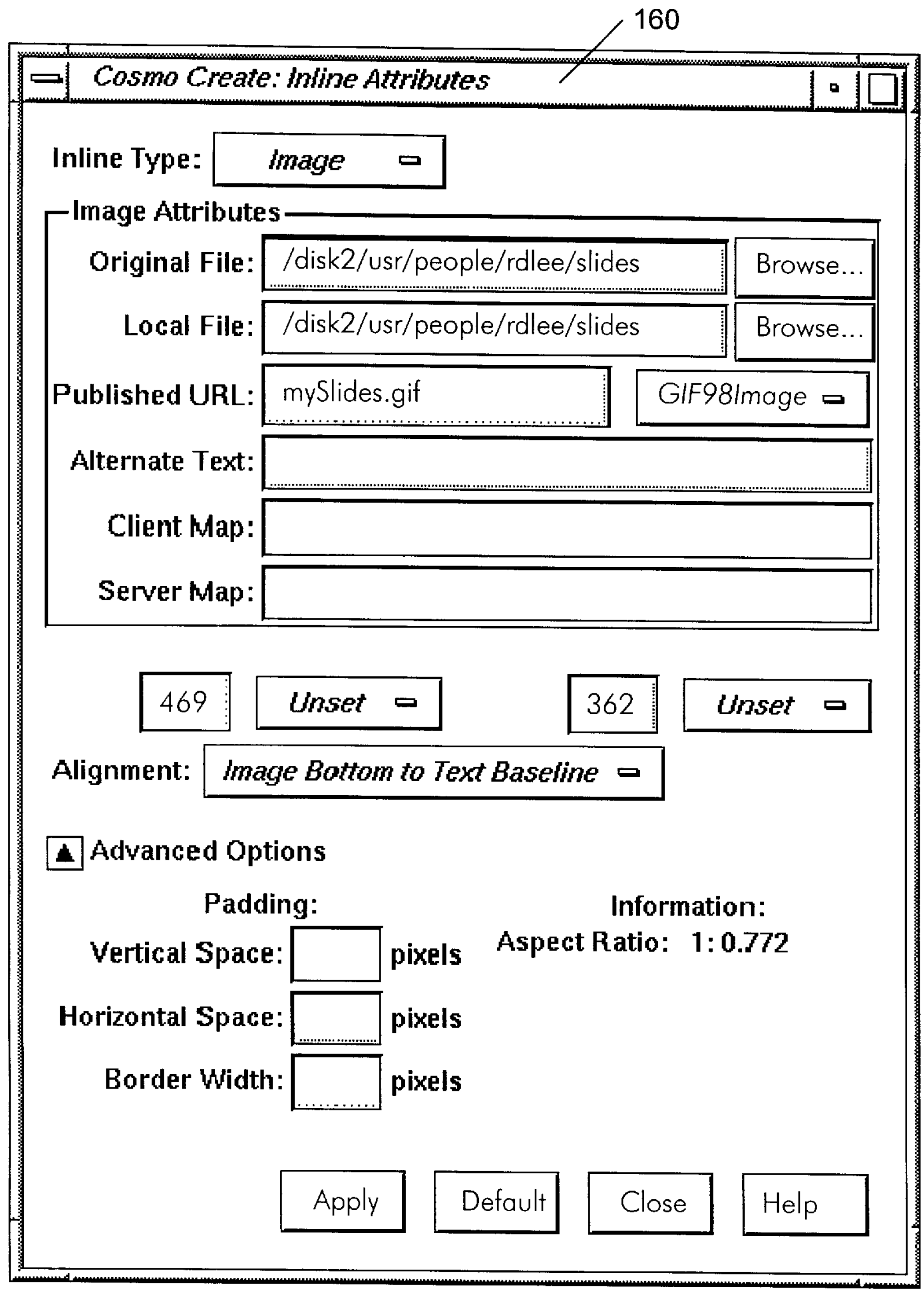
FIG. 16 shows an inline attributes dialog for the image in the HTML page shown in FIG. 15.

An example of out-of-place editing using the Showcase helper application, a powerful multimedia development tool that allows sophisticated multimedia content to be created simply and efficiently, is described with reference to FIGS. 15–19. FIG. 15 shows a Cosmo™ Create window 150 with a web page undergoing development that includes an object 152 composed of two rectangles 154 and 156, a circle 158 and various colors, patterns, shapes and text. As indicated in the corresponding inline attributes dialog 160 and the converting preferences panel 170 shown in FIGS. 16 and 17, respectively, object 152 is an inline image that has been converted from the Showcase format (SC) to the GIF format as specified by the information 172 in the converting panel. Both the original file (Slides.sc) and the local file (Slides.gif) reside in the same directory in the file system (/disk2/usr/people/rdlee).

Figure 18:
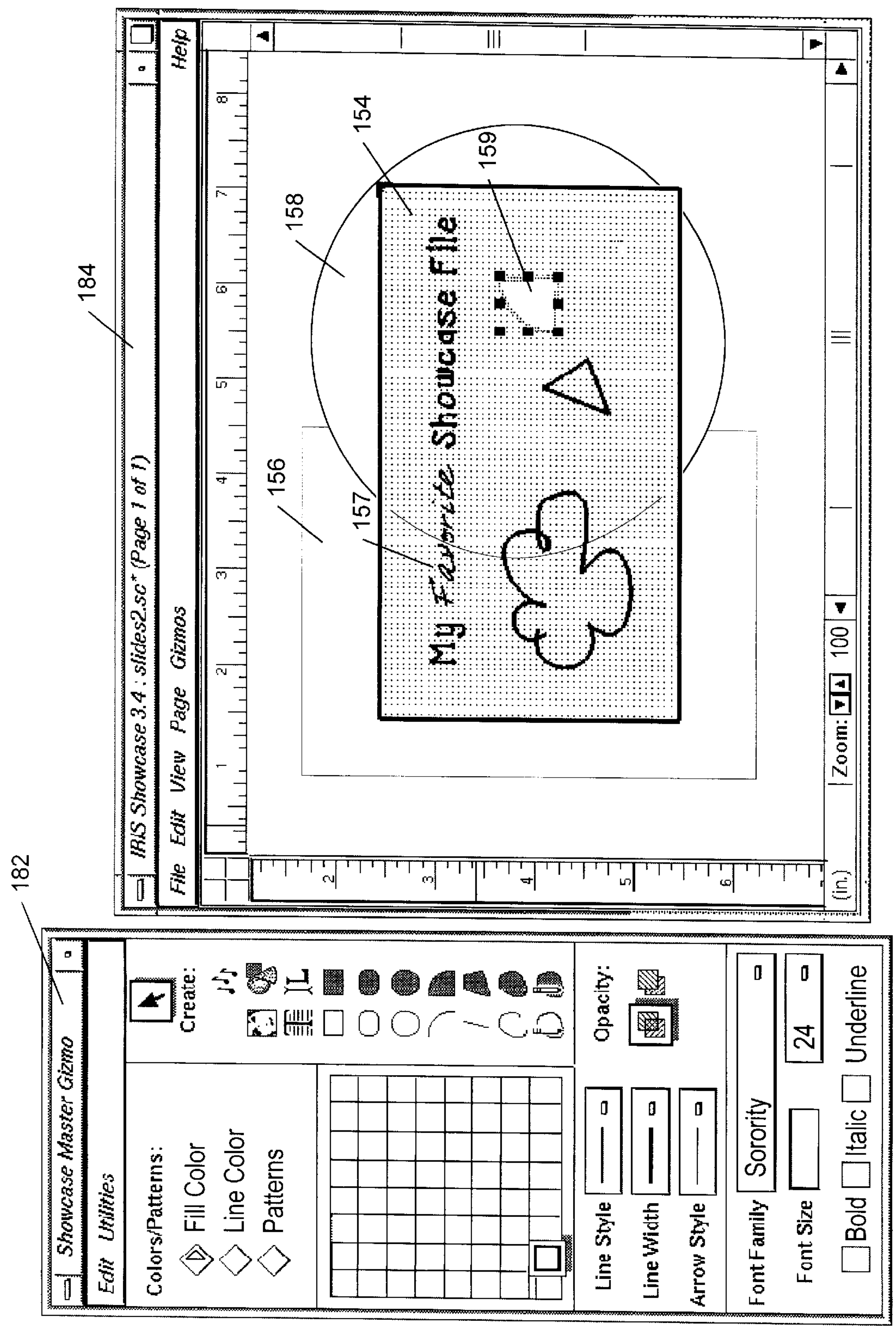
FIG. 18 shows the image in the HTML page of FIG. 15 being edited in the Showcase multimedia development environment.

To edit object 152, the user first clicks on the object to select it. In response, Cosmo™ Create enables (i.e., does not gray out the corresponding button on the editors palette) all the editors that are capable of editing the FTR file types of the selected object's native format or its local web-publishable format. The user then invokes the Showcase application by clicking the Showcase button in the object editors palette. In response, Showcase launches and opens the original file specified in the inline attributes panel, Slides.sc, which contains the native format version of object 152. FIG. 18 shows a screen shot of the two windows presented by Showcase upon being launched—a tool window 182 and an editing window 184. The author then uses Showcase's editing tools to manipulate the various components in the scene, for example, by changing the font for text 157 and by moving shapes 156, 158 and 159 relative to other objects in the scene.

Figure 17:
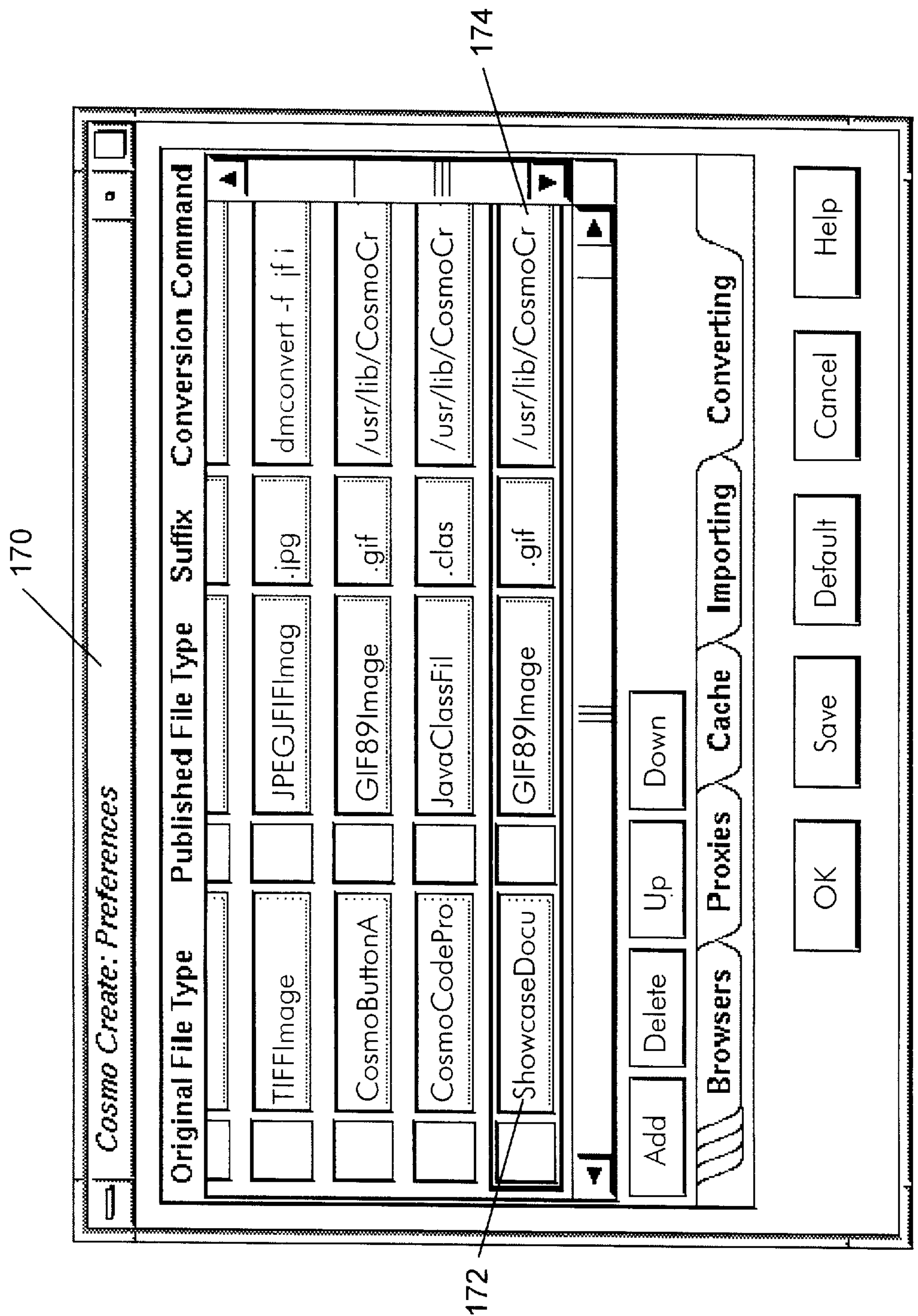
FIG. 17 shows a converting preferences panel for the HTML page shown in FIG. 15.
Figure 19:
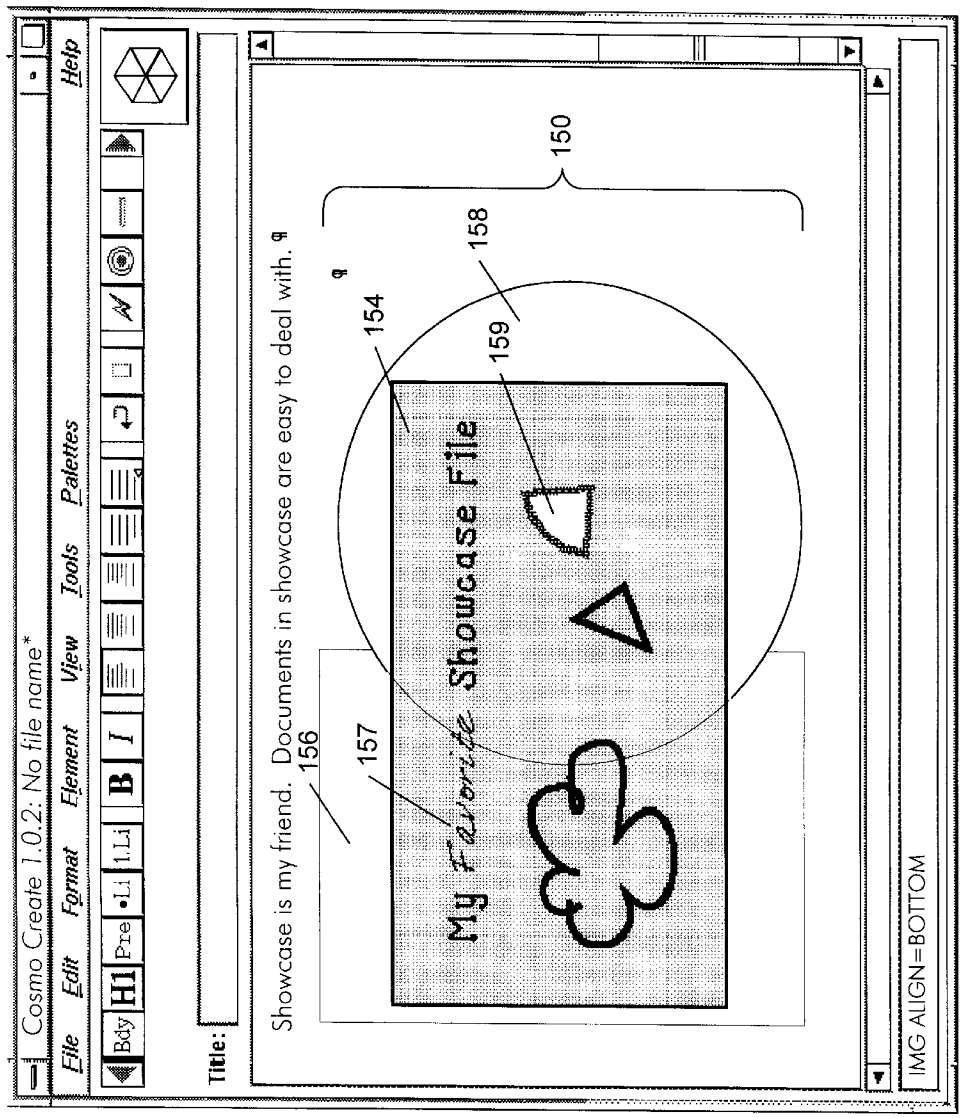
FIG. 19 shows the HTML page of FIG. 15 after the image has been edited in the Showcase multimedia development environment.

When the desired changes have been made, the author initiates a save command which saves the Showcase scene back to its original file location (Slides.sc) in its native format (Showcase). This save event is detected by the FAM which informs Cosmo™ Create that a new version of Slides.sc exists. In response, Cosmo™ Create checks whether a conversion rule exists for converting the Showcase file to its web-publishable format as a GIF image and, if so, invokes the conversion command 174 specified in the converting preferences panel 170 (FIG. 17). The conversion command converts the Showcase document, Slides.sc, to the GIF format and stores the result in Slides.gif. Cosmo® Create then refreshes the window to display the new version of object 152 as shown in FIG. 19. If no conversion command for converting from Showcase to GIF existed, Cosmo™ Create would use the first conversion rule for Showcase files that appeared in the list of conversion rules.

The native format used by Showcase supplies a rich body of functionality that would not be available if the author were limited to using standard web-publishable formats in building web pages. The fonts used for the text in object 152, for example, are not supported by HTML but are made readily available to authors by Cosmo™ Create's out-of-place editing mechanism. By providing easy access to virtually all media formats and editing environments in this manner, an author's ability to create complex and sophisticated multimedia documents is enhanced considerably.

Figure 20:
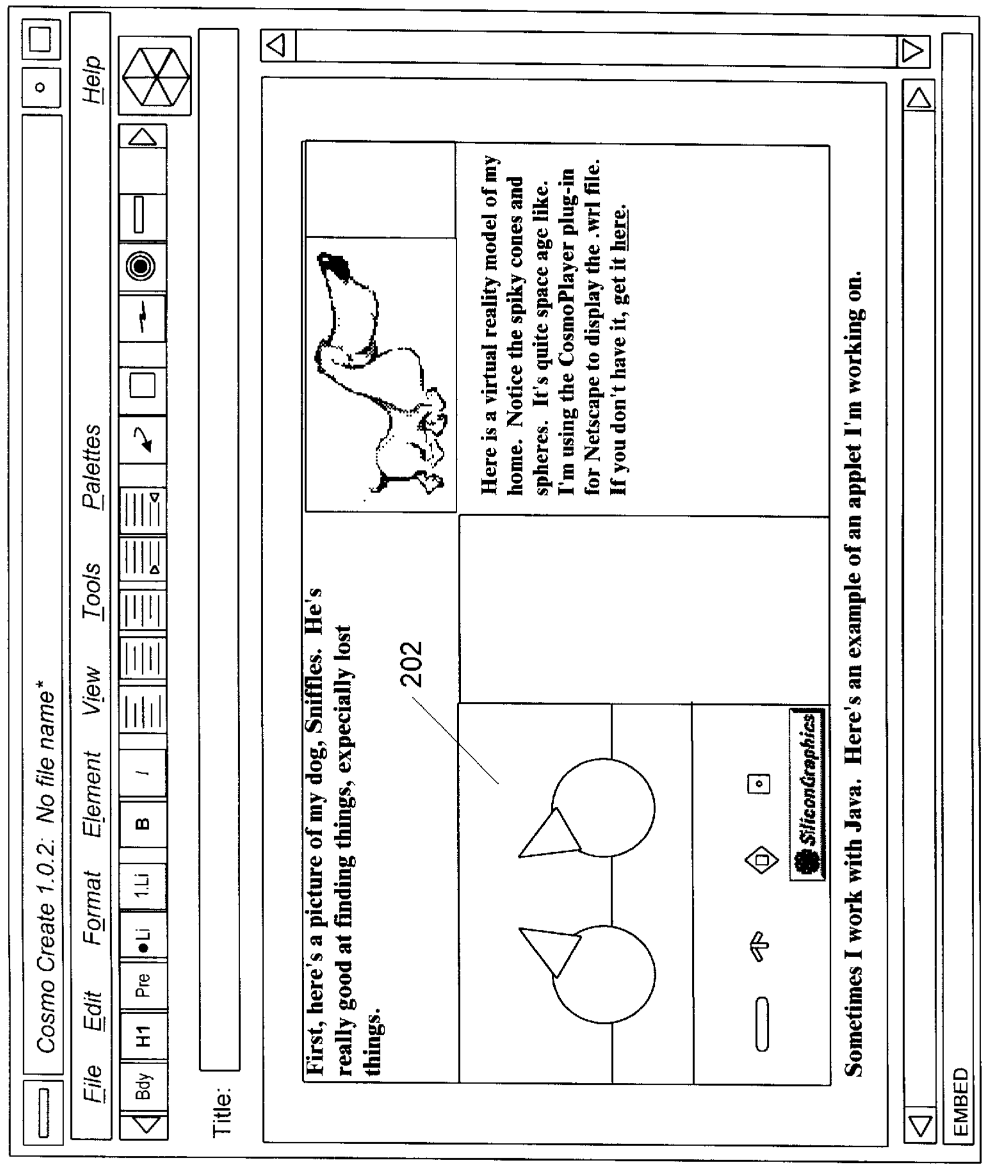
FIG. 20 shows an HTML page undergoing development in the Cosmo™ Create HTML page layout environment including an 3D virtual world plug-in created with the Cosmo™ Worlds 3D authoring tool.
Figure 21:
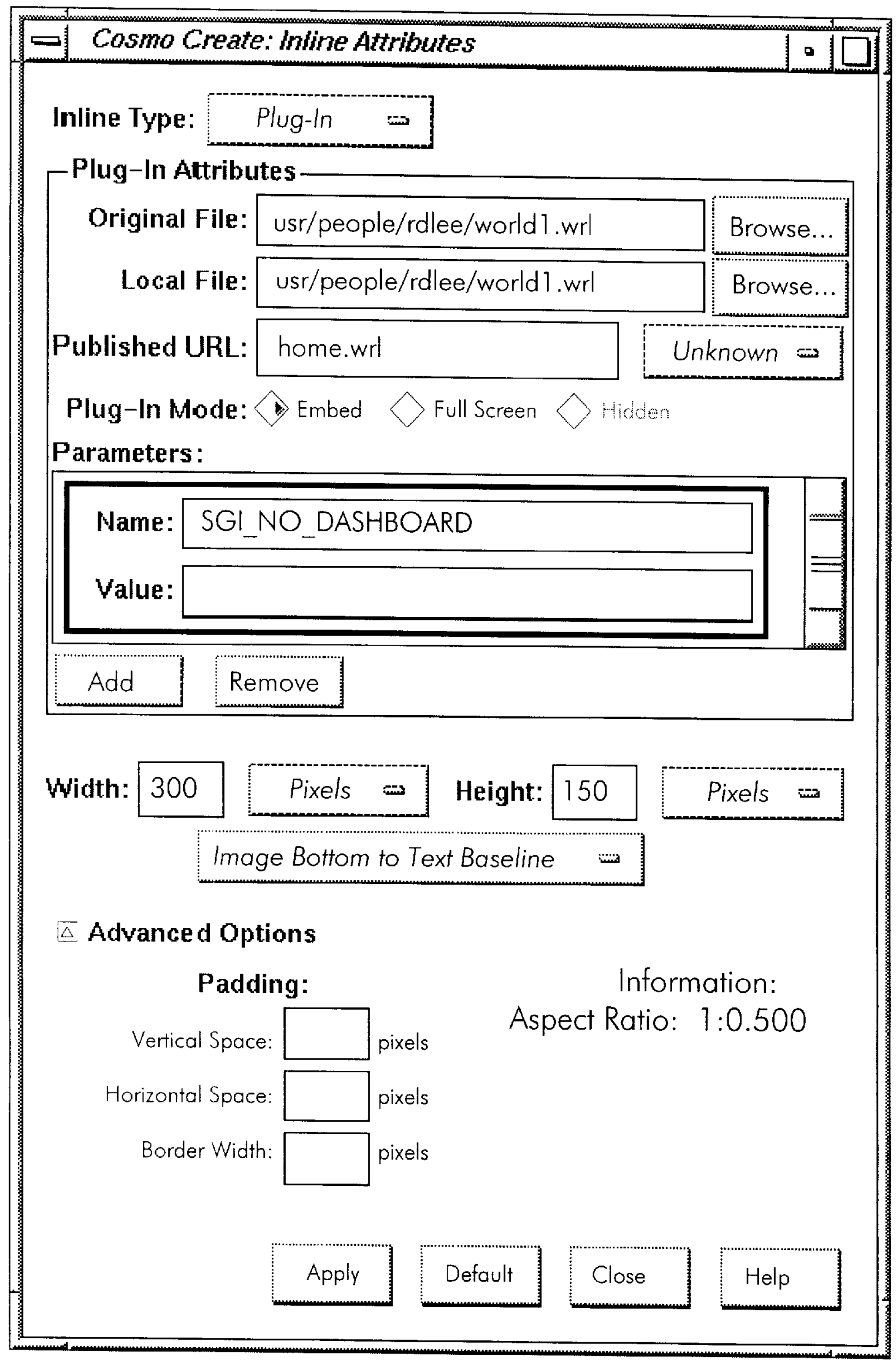
FIG. 21 shows an inline attributes dialog for the plug-in in the HTML page shown in FIG. 20.

The conversion between different formats and the maintenance of dual versions of a multimedia object is optional and is driven by the needs of the author. Even where no conversion is needed (e.g., when a multimedia object's native format is web-publishable), Cosmo™ Create's out-of-place editing features come in handy. The HTML page undergoing development in FIG. 20, for example, includes an inline plug-in 202 which is a 3D virtual world in the VRML (equivalently, WRL) format. Because VRML is supported by several standard plugins, no conversion is needed to include the 3D world in a web page. As shown in FIG. 21 in the inline attributes dialog for plug-in 202, the "original file" and the "local file" are one and the same:

/usr/people/rdlee/world.wrl.

A 3D world is "virtual" in the sense that the space it occupies and its graphic elements and characteristics, are conceptual rather than actual, but possess the functional (e.g., optical and spatial) properties of the physical entities that they represent. Creating and editing 3D worlds accordingly requires a sophisticated editing environment that enables an author to manage the complexities of manipulating objects in 3D virtual space. Cosmo™ Create's out-of-place editing mechanism provides seamless access to any desired 3D authoring tool for this purpose.

Figure 22:
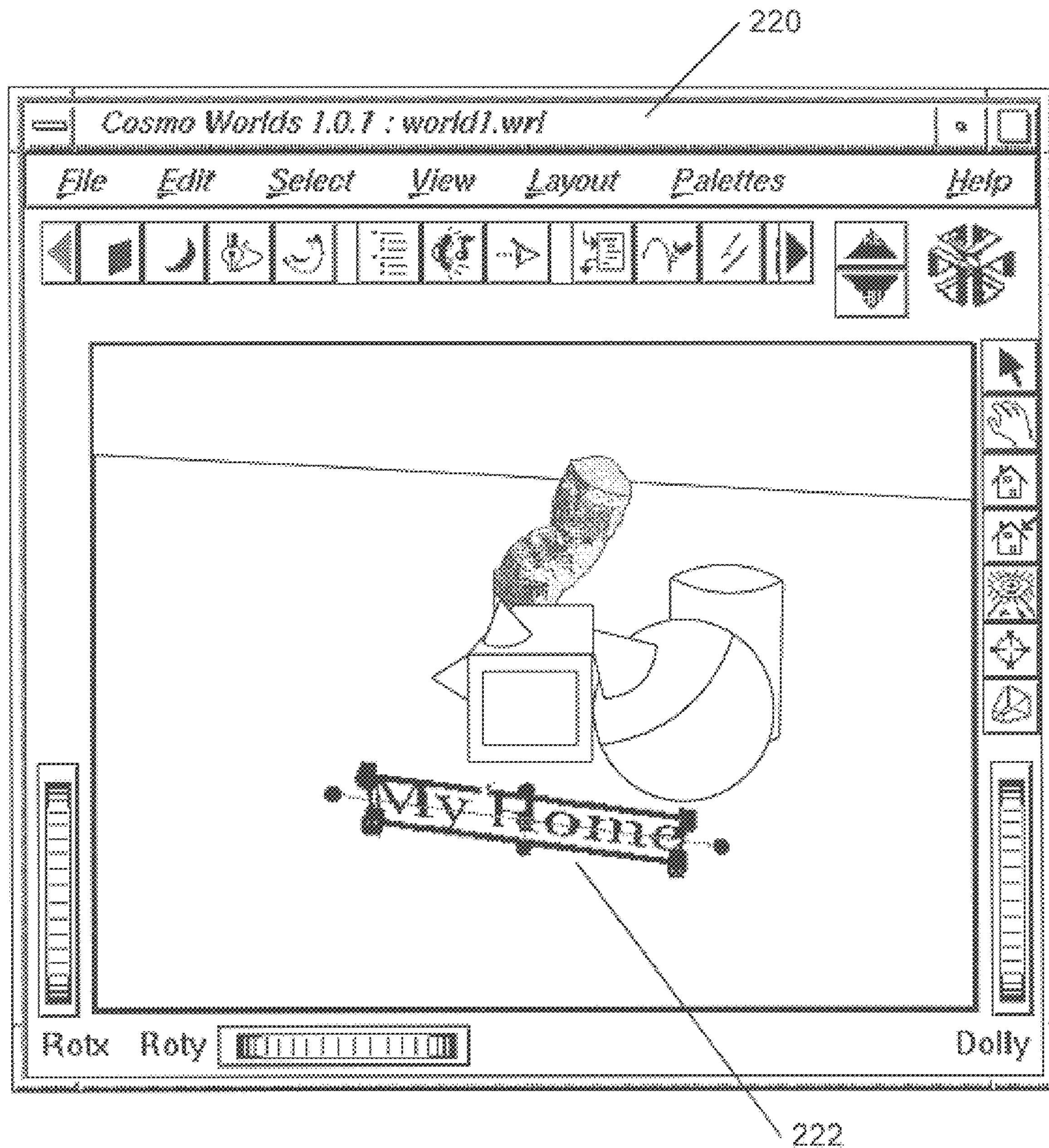
FIG. 22 shows the plug-in in the HTML page of FIG. 20 being edited with the Cosmo™ Worlds 3D authoring tool.
Figure 23:
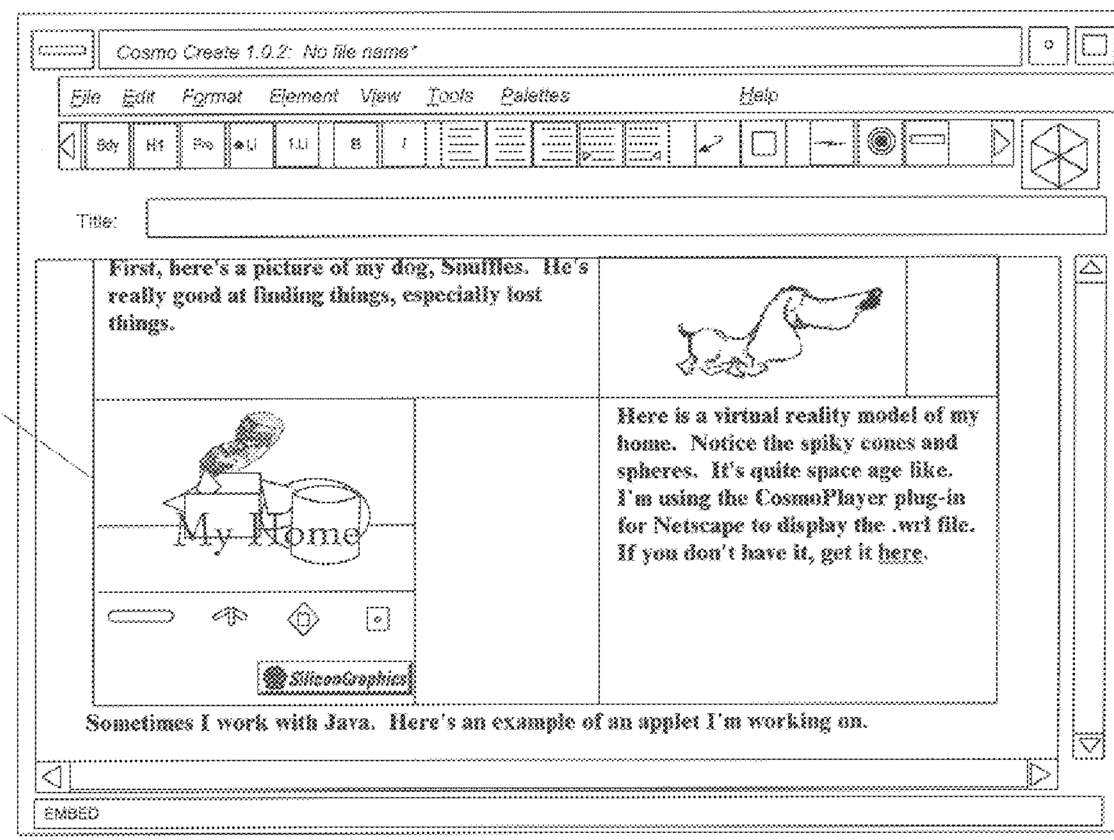
FIG. 23 shows the HTML page of FIG. 20 after the 3D plug-in has been edited with the Cosmo™ Worlds 3D authoring tool.
Figure 24:
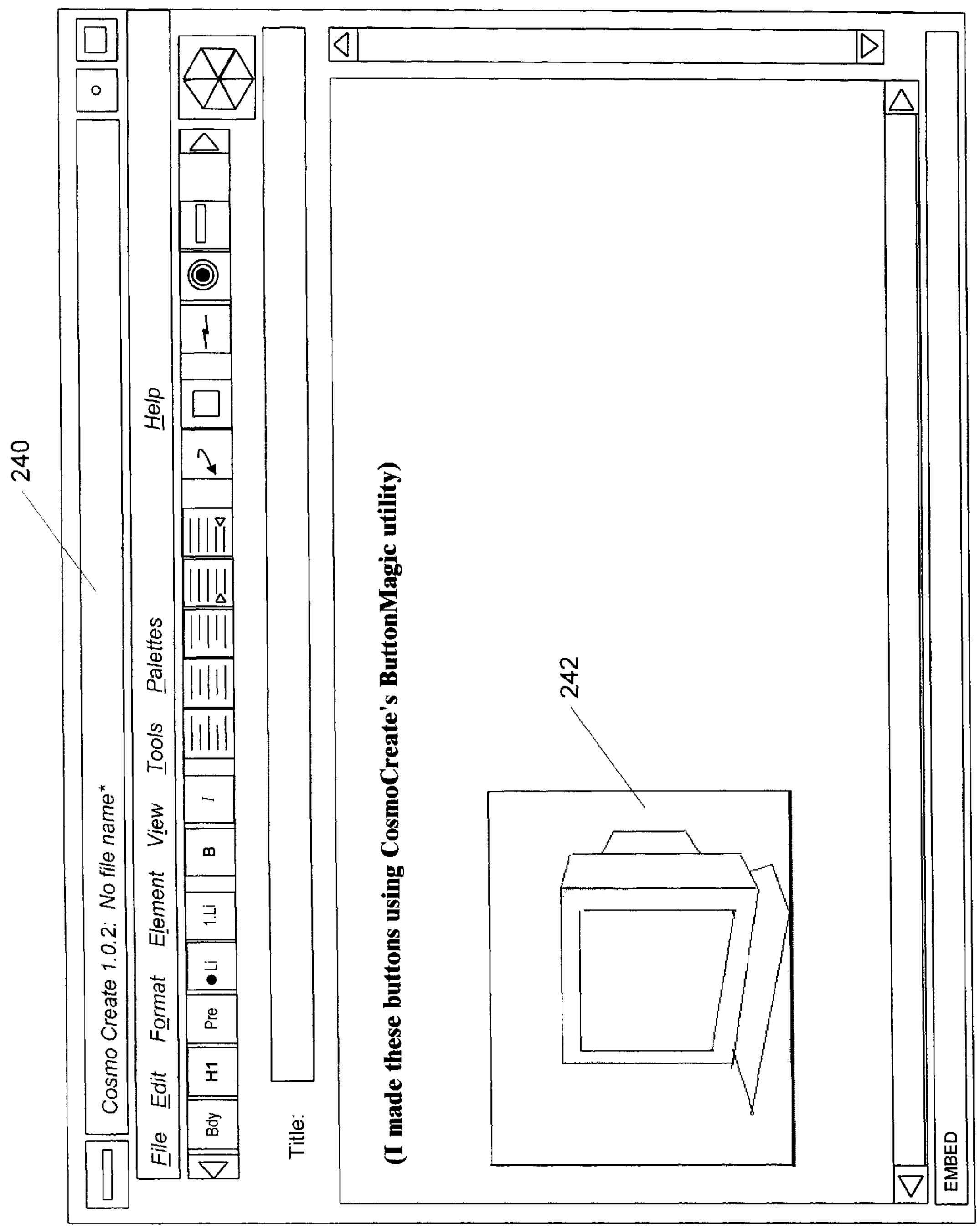
FIG. 24 shows an HTML page undergoing development in the Cosmo™ Create HTML page layout environment including a still image taken from a movie created with the Movie Maker editor.

In the example shown in FIG. 22, the author has invoked Silicon Graphics™ Cosmo™ Worlds, an editing environment for creating and manipulating 3D worlds. Using the editing tools supplied by the Cosmo™ Worlds window 220, the author can modify the 3D world, for example, by adding a text object 222, "My Home," at a specified location within the 3D world. When the author initiates a save operation while in Cosmo™ Worlds, the FAM detects a new version of the original file, world1.wr1, and passes this information on to Cosmo™ Create which, as shown in FIG. 23, refreshes the window to display the new version 230 of the 3D world. No conversion or file creation is performed by Cosmo™ Create in this example due to the particular inline attributes and converting preferences specified by the author.

Cosmo™ Create also provides authors with the ability to view objects both in their web standard formats and in non-web-publishable formats from directly within the Cosmo® Create editing window. To do so, Cosmo™ Create will automatically load available web standard plugins as appropriate to handle content for which Cosmo™ Create does not provide native support.

Figure 25:
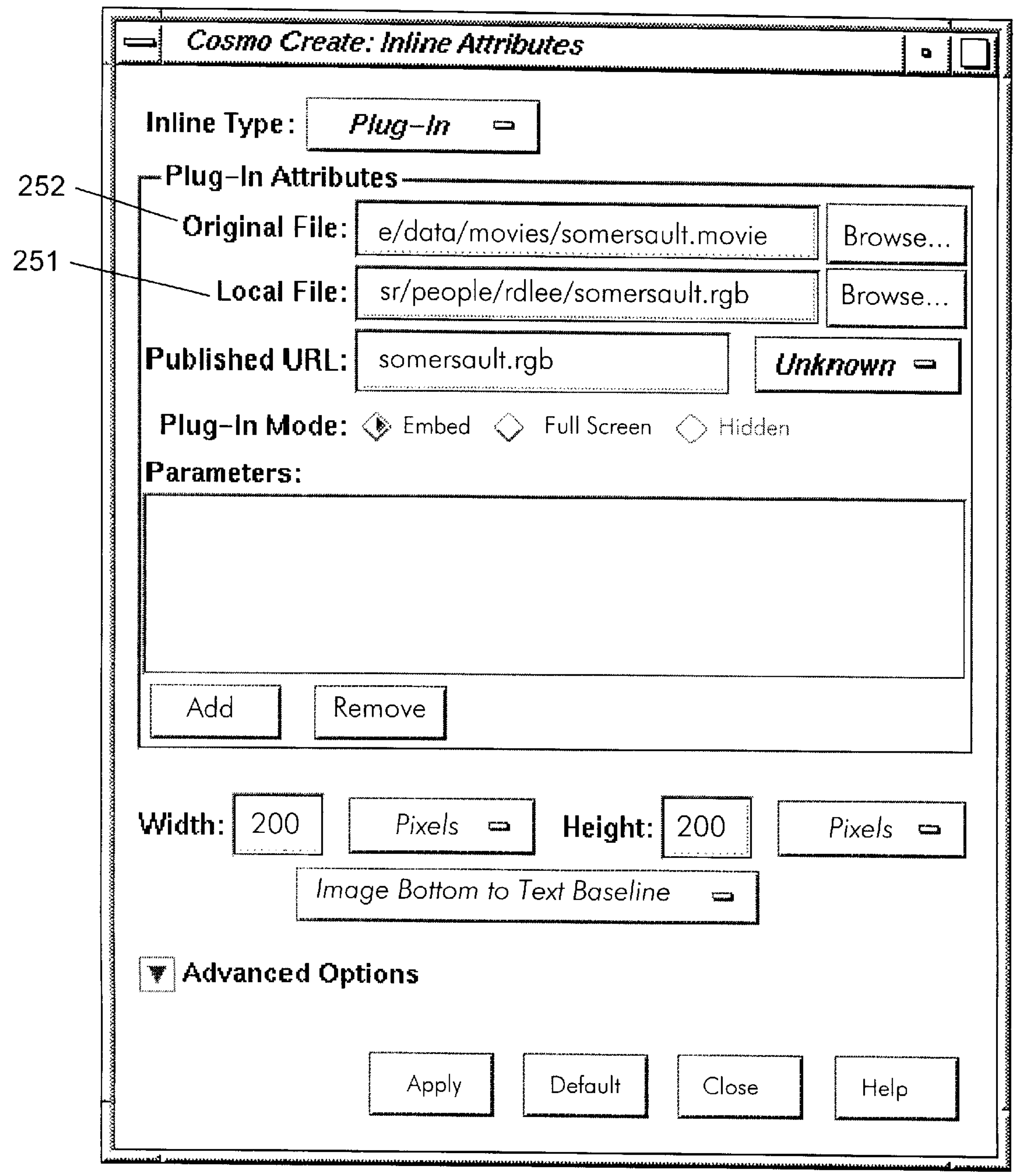
FIG. 25 shows an inline attributes dialog for the image in the HTML page shown in FIG. 24.
Figure 26:
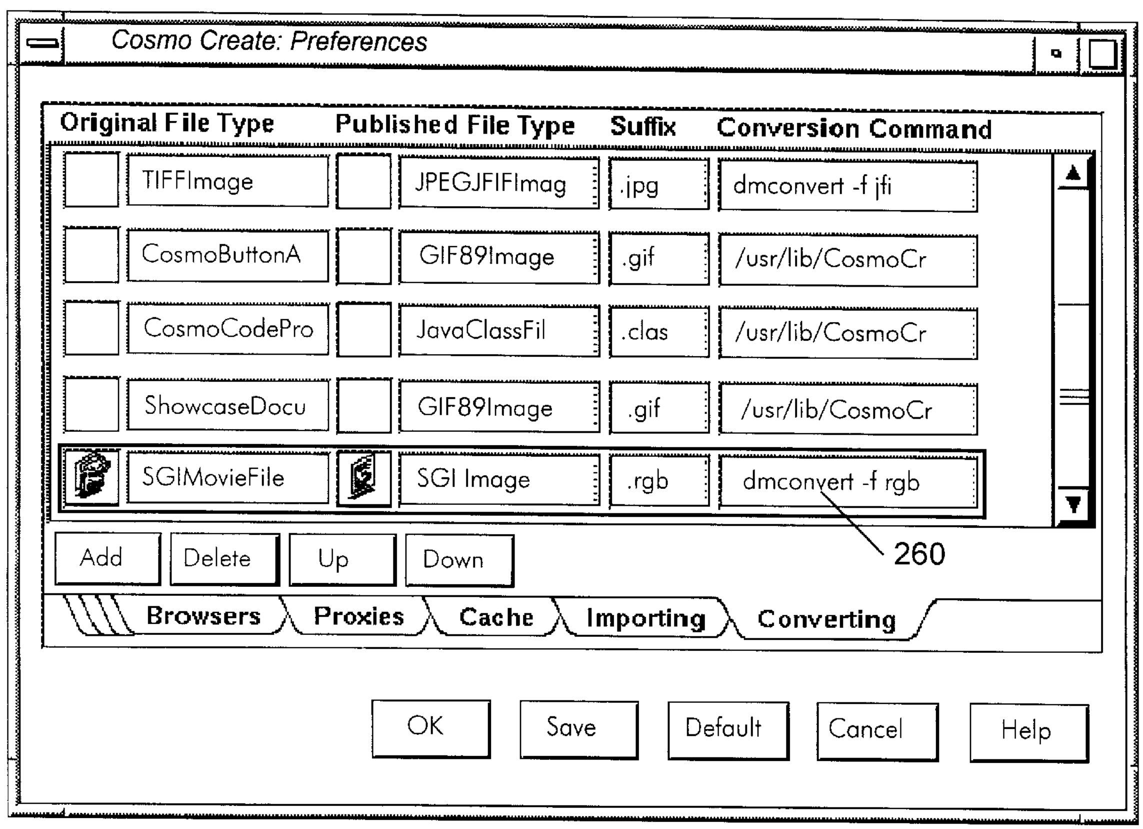
FIG. 26 shows a converting preferences panel for the HTML page shown in FIG. 24.
Figure 27:
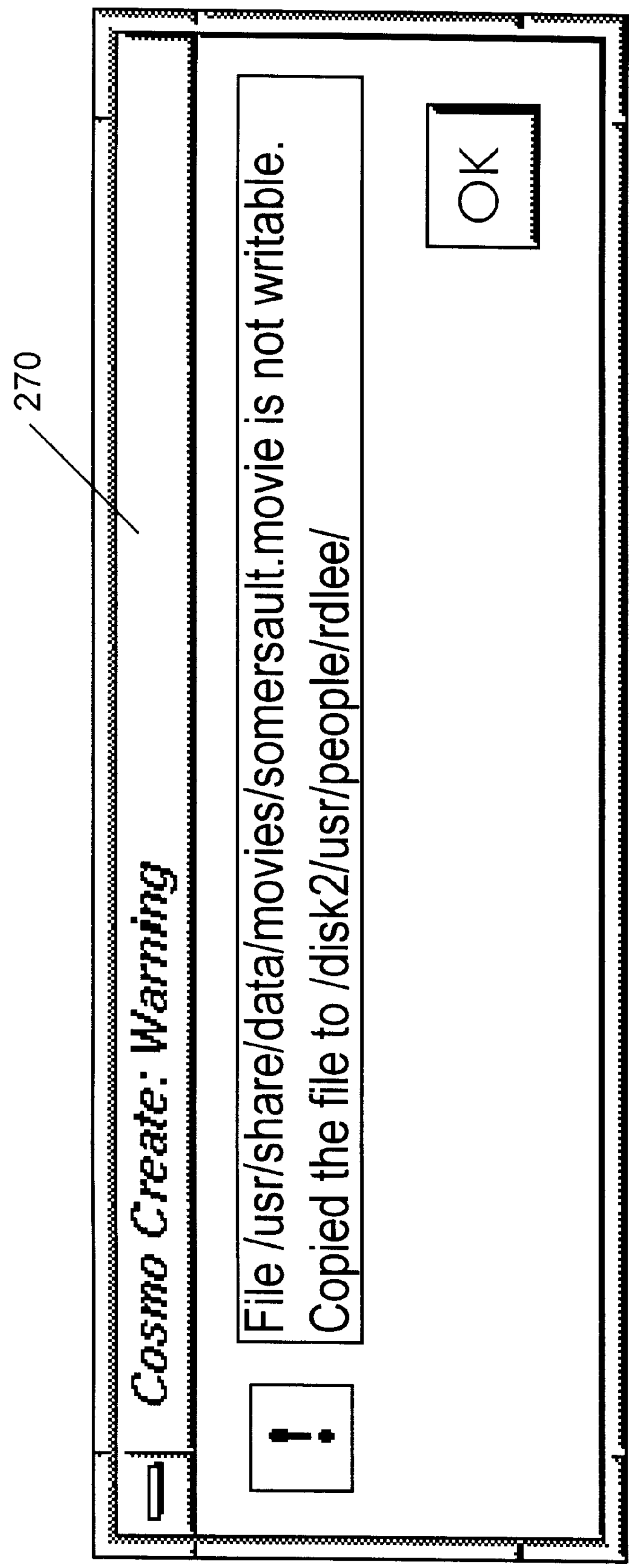
FIG. 27 shows a pop-up warning message.

FIGS. 24–29 illustrate another application for Cosmo™ Create's automatic conversion capability—namely, the ability to convert between different formats across different types of media. The Cosmo™ Create window 240 shown in FIG. 24 includes an inline 242 of the type "plugin" showing a still view of a computer monitor. An inline plug-in, as opposed to an inline of the type "image," is needed in this case to represent the computer monitor image because, as shown in FIG. 25, the local file 251 is in RGB—a non-standard HTML format. Cosmo™ Create generated the computer monitor image 242 shown in FIG. 24 by using the conversion command 260 specified in the converting preferences panel (FIG. 26) to convert the first frame of a movie residing in the original file 252 (/usr/data/movies/somersault.movie) to an image in the RGB format. Cosmo™ Create then stored the result of the conversion in the local file 251 specified in the inline attributes panel (/usr/people/rdlee/somersault.rgb).

The author may designate a different still view from the movie by editing the movie to specify the desired frame. To do so, the author clicks on inline 242 to select it at which point the editor applications available to edit inlines of that FTR type will appear as active buttons in the editors palette. The user can then click on the Movie Maker button to launch the Movie Maker application. In this example, however, the original file, /usr/share/data/movies/somersault.movie, is limited to read-only access and consequently cannot be edited. Instead, Cosmo™ Create pops-up the warning message 270 shown in FIG. 27 informing the author that the Movie Maker application instead will open a copy of the original file, /disk2/usr/people/rdlee/somersault.movie, created for that purpose.

Figure 28:
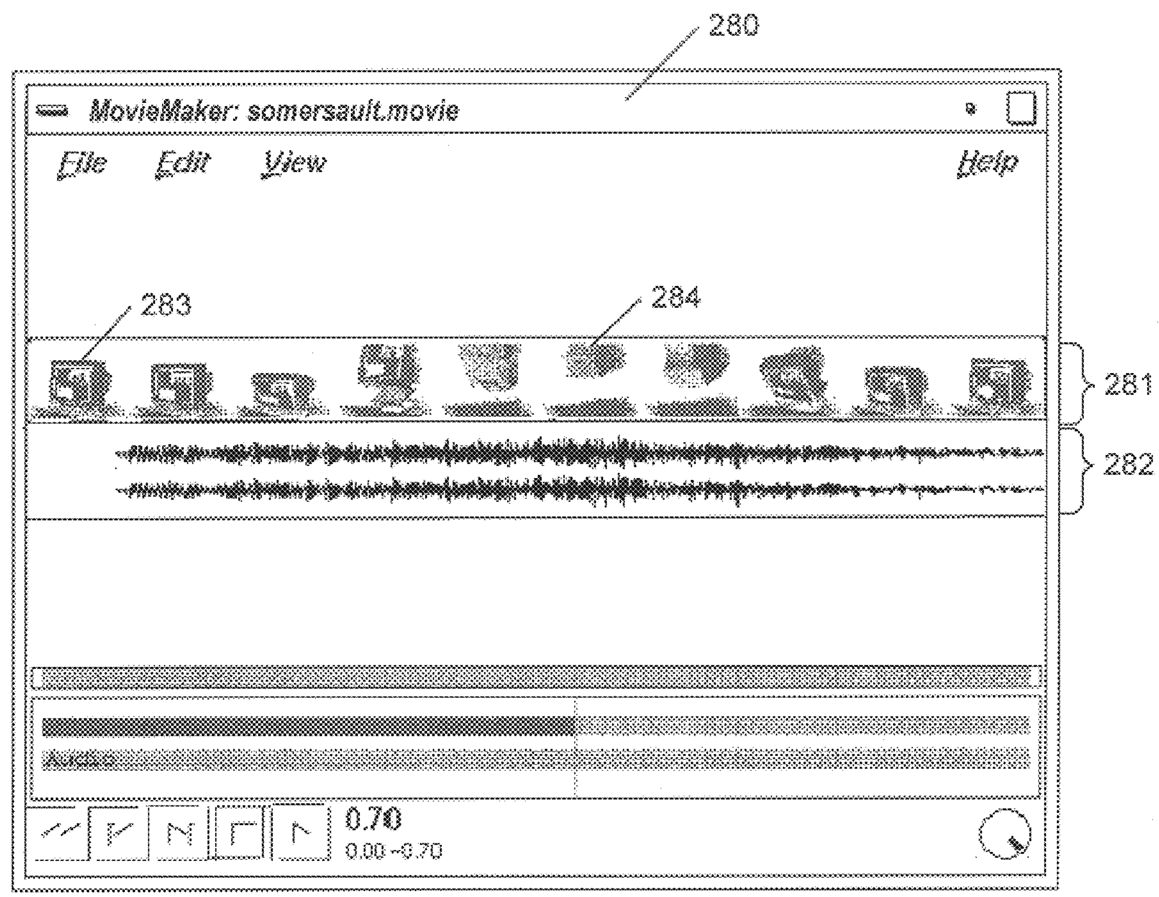
FIG. 28 shows the movie from which the still image in the HTML page of FIG. 24 was taken being edited with the Movie Maker editor.
Figure 29:
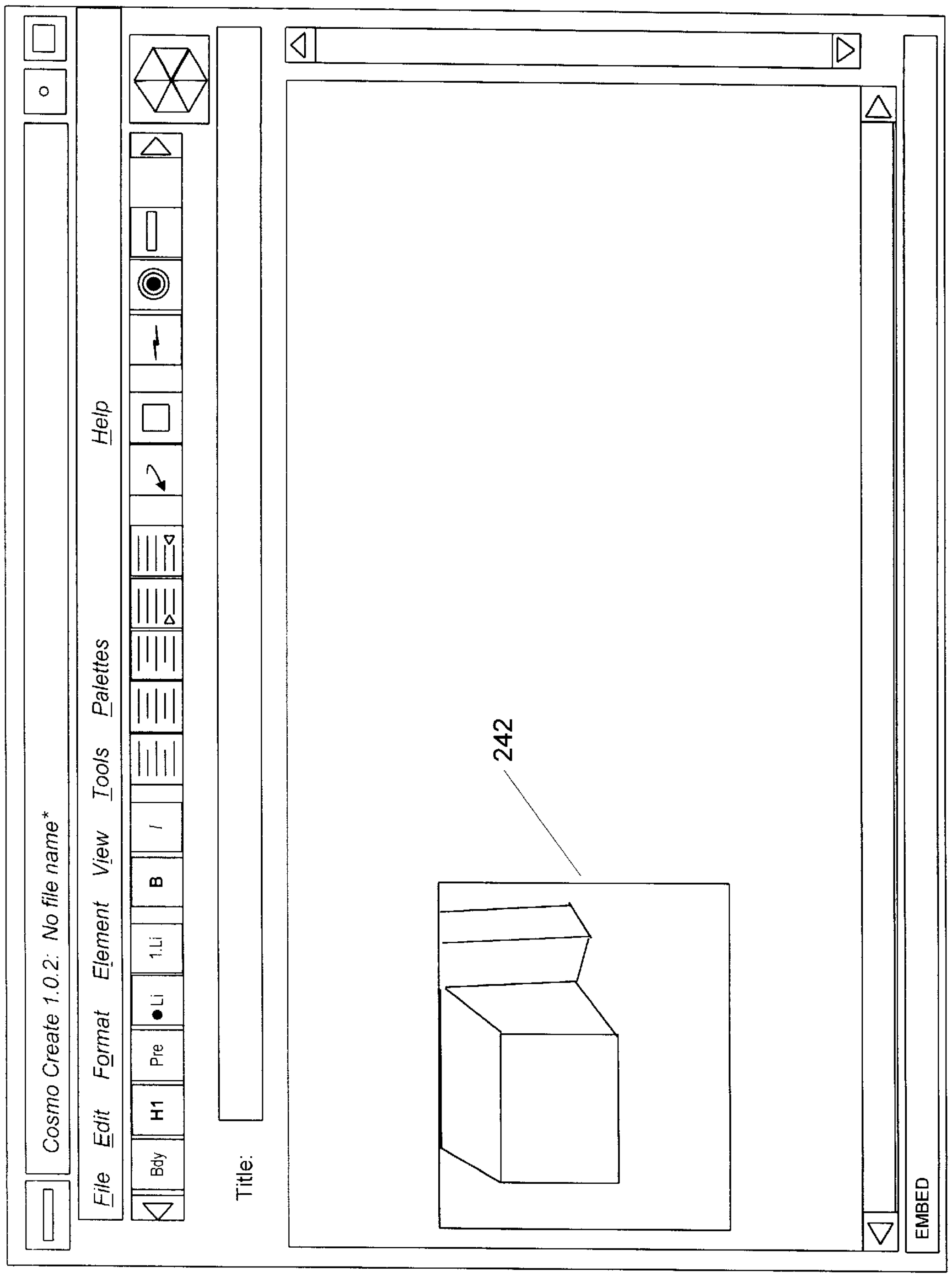
FIG. 29 shows the HTML page of FIG. 24 after the movie has been edited with the Movie Maker editor.

Movie Maker's main editing window, shown in FIG. 28, includes a video track 281 showing each frame of movie with a corresponding audio track 282 displayed underneath. In this example, the author deletes the first half of the movie so that the first frame of the movie becomes frame 284. When the author next initiates a save command from within the Movie Maker application, the FAM detects a new version of the copy of the original file, /disk2/usr/people/rdlee/somersault.movie, and informs Cosmo™ Create of that fact. Using the conversion and attribute parameters specified by the author, Cosmo™ Create converts the first frame of the edited movie to RGB format, saves a local copy, and updates the display in the Cosmo™ Create editing window. As shown in FIG. 29, inline plug-in 242 now shows a different still view of the computer monitor corresponding to the first frame of the edited movie, specifically frame 284 in FIG. 28 showing a backside, upside-down view of the monitor as it performs a somersault.

Several variations of out-of-place editing functionality are possible. One such variation is that Cosmo™ Create could keep track of a chain of editors and conversions that are built up over time such that the user can go back to any point in the chain and resume operation from there. For example, a user could import a scanned in PICT format image into Cosmo™ Create which would convert the image, based on the conversion preferences in effect, into a Photoshop format image. The user could then out-of-place edit the Photoshop image in the Photoshop application and save the image in the Photoshop native format. Upon being informed of the save event by the FAM, Cosmo™ Create could be configured to automatically convert the Photoshop format image into an RGB format image and save the result in a new local file. That RGB file could then be out-of-place edited in yet another editing environment and be converted to, and saved as, a GIF image. This chain of editing and converting potentially could continue on indefinitely. Any or all of the representations of the object within the chain would be available to the user.

The techniques described here were implemented on Silicon Graphics machines using the Open Inventor Toolkit, Motif, OpenGL, and the C++ programming language. The methods and mechanisms described here are not limited to an HTML authoring environment or to any other particular hardware or software configuration, but rather they may find applicability in any computing or processing environment in which multimedia content may be created or manipulated, for example, word processing programs, drafting and drawing programs, visual programming environments, software development tools and the like. These techniques may be implemented in hardware or software, or a combination of the two. Preferably, the techniques are implemented in computer programs executing on programmable computers that each include a processor, a storage medium readable by the processor (including volatile and non-volatile memory and/or storage elements), and suitable input and output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method performed on a computer system of generating multimedia documents, the method comprising:

representing an object in a multimedia document using a standard format;

enabling the object to be manipulated in a native format different from the standard format;

receiving configuration parameters from a user; and upon an occurrence of a predetermined event, converting the native format to the standard format based on the received configuration parameters.

2. The method of claim 1 further comprising displaying the object in the multimedia document using the converted standard format.

3. The method of claim 1 further comprising generating a local file representative of the object in the converted standard format.

4. The method of claim 3 further comprising displaying the object in the multimedia document using the local file.

5. The method of claim 3 further comprising maintaining an original file representative of the object in the native format.

6. The method of claim 1 in which the representing comprises treating the object as an inline image in the multimedia document.

7. The method of claim 1 in which the representing comprises treating the object as an inline plug-in in the multimedia document.

8. The method of claim 1 in which the representing comprises treating the object as an inline applet in the multimedia document.

9. The method of claim 1 in which the enabling comprises invoking an editing environment.

10. The method of claim 1 in which the enabling comprises invoking an external application associated with the native format.

11. The method of claim 10 in which the invoking comprises starting the external application from within another application.

12. The method of claim 1 in which the converting comprises translating from the native format to a web-publishable format.

13. The method of claim 1 in which the converting comprises translating from a format associated with a first media type to a format associated with another media type different from the first media type.

14. The method of claim 1 in which the converting comprises translating from a movie format to an image format.

15. The method of claim 1 in which the predetermined event comprises a save operation.

16. The method of claim 1 in which the converting comprises transforming a native format representation of the object to a standard format representation of the object upon detecting that a save operation has been performed.

17. The method of claim 1 in which the converting comprises generating a local file in the standard format based on a source file in the native format.

18. The method of claim 1 in which the standard format is web-publishable.

19. The method of claim 18 in which the native format is web-publishable.

20. The method of claim 1 in which the native format represents a functionally richer format than the standard format.

21. The method of claim 1 in which the object comprises one or more of the following media types: image, text, movie, plug-in, virtual world, applet, and sound.

22. A method of generating multimedia documents on a computer system, the method comprising:

providing an author with an interactive graphic development environment for developing a multimedia document that includes an object represented in a standard format;

in response to input from the author, invoking from within the graphic development environment an application that enables the object to be manipulated in a native format different from the standard format;

automatically converting a representation of the object from the native format to the standard format upon detecting that a predetermined operation has been performed by the application; and concurrently maintaining at least two files representative of the object including a first file in which the object is represented in the native format and at least one other file in which the object is represented in the standard format.

23. The method of claim 22 further comprising displaying the object in the standard format within a multimedia document.

24. The method of claim 22 in which the invocation of an application for manipulating the object and the automatic conversion between different representations of the object could be repeated such that one converted representation of the object is manipulated and converted to another converted representation.

25. The method of claim 24 in which the invoking and converting are repeated a plurality of times.

26. A multimedia document development system comprising:

multiple representations of a multimedia component including a standard-format representation and a native-format representation;

a graphical environment for constructing a multimedia document using multimedia components in their respective standard formats;

helper applications invocable from within the graphical environment for manipulating the multimedia components in their respective native formats; and a conversion process for automatically converting a native-format representation of a multimedia component to a standard-format representation of a multimedia component in response to a recognition that a new native-format representation of a multimedia component has been generated.

27. The system of claim 26 in which the recognition of a new native-format representation arises when a helper application performs a save operation.

28. Computer software for a multimedia development system, the computer software residing on a computer-readable medium and comprising instructions for causing a computer to perform the following operations:

display a media object in a standard format;

invoke a helper application that allows a user to manipulate the media object in a native format different from the standard format;

monitor for the existence of a new native-format version of the media object;

upon detecting the existence of a new native-format version of the media object, convert the new native-format version of the media object to a new standard-format version of the media object; and display the new standard-format version of the media object.

29. The computer software of claim 28 further comprising instructions to maintain multiple files representative of the media object in different formats.

30. The computer software of claim 28 further comprising instructions to enable the user to specify helper applications.

31. The computer software of claim 28 further comprising instructions to enable the user to specify the standard format and the native format of a media object.

32. A computer-based method for use with an object included in a multimedia document within an editing environment associated with a common file format, the object being associated with an application program having a different native file format, the method comprising:

maintaining two files representative of the object, one file in the common file format, the other file in the different native format; and synchronizing content of the two files in response to work done on the document by a user working in the editing environment.

33. A computer-implemented method of developing multimedia documents, the method comprising:

representing a plurality of media elements in a multimedia document using one or more standard formats recognized by a first editor application;

enabling at least one of the media elements in the multimedia document to be edited by another editor application in a native format different from the media element's standard format; and upon occurrence of a predetermined event, converting the media element's native format to the media element's standard format.

34. The method of claim 33 in which the predetermined event comprises a save operation performed by the other editor application.

35. The method of claim 33 which the predetermined event comprises a recognition that a new native-format representation of the media element exists.

36. The method of claim 33 further comprising maintaining at least two files representative of the media element including a first file in which the media element is represented in the native format and at least one other file in which the media element is represented in the standard format.

37. The method of claim 33 in which the enabling comprises:

automatically identifying file types of a file associated with the native format of the object using file typing rules;

determining the file associated with the standard format of the object; and enabling appropriate editor applications based on the file types.

38. The method of claim 33 in which the converting is based on default conversion parameters.

39. The method of claim 33 in which the converting is based on user-specific conversion parameters.

* * * * *